(12) United States Patent
Yates

(10) Patent No.: US 12,292,896 B1
(45) Date of Patent: May 6, 2025

(54) MULTI-DIMENSIONAL CONTENT ORGANIZATION AND ARRANGEMENT CONTROL IN A USER INTERFACE OF A COMPUTING DEVICE

(71) Applicant: Promoted.ai, Inc., San Francisco, CA (US)

(72) Inventor: Andrew Donald Yates, San Francisco, CA (US)

(73) Assignee: Promoted.ai, Inc., San Francisco, CA (US)

( * ) Notice: Subject to any disclaimer, the term of this patent is extended or adjusted under 35 U.S.C. 154(b) by 0 days.

(21) Appl. No.: 18/956,172

(22) Filed: Nov. 22, 2024

Related U.S. Application Data

(63) Continuation-in-part of application No. 18/943,304, filed on Nov. 11, 2024, and a continuation-in-part of
(Continued)

(51) Int. Cl.
*G06F 16/2457* (2019.01)
*G06F 7/08* (2006.01)
(Continued)

(52) U.S. Cl.
CPC .......... *G06F 16/24578* (2019.01); *G06F 7/08* (2013.01); *G06F 16/2264* (2019.01); *G06F 16/248* (2019.01)

(58) Field of Classification Search
CPC .......... G06F 16/24578; G06F 16/2264; G06F 16/248; G06F 7/08
See application file for complete search history.

(56) References Cited

U.S. PATENT DOCUMENTS

2005/0065959 A1\* 3/2005 Smith ................. G06F 16/9537
707/999.102
2007/0192300 A1 8/2007 Reuther et al.
(Continued)

OTHER PUBLICATIONS

Pierce, David. "The AI takeover of Google Search starts now." May 10, 2023. 13 pages. https://www.theverge.com/2023/5/10/23717120/google-search-ai-results-generated-experience-io (Year: 2023).

*Primary Examiner* — Hau H Hoang
(74) *Attorney, Agent, or Firm* — Cognition IP, P.C.; Edward Steakley

(57) ABSTRACT

Methods and systems provide content searching and retrieval using generative artificial intelligence (AI) Models. The system is configured to receive a user search for content, media or item listings. The system receives a natural language-based input associated with a client device of a user. The system generates a search criterion for the received natural language-based input. The system, via the generative AI-bases search and retrieval system, generates a relevancy-ranked output listing of content items. The relevancy-ranked output listing content items responsive to the generated search criterion content items having an associated content identifier and a content description. The system generates a carousel display structure definition of the relevancy-ranked content items. The system transmits the carousel display structure definition of the relevancy-ranked content items and the content items to the client device. The client device renders, via a user interface, at least a portion of the relevancy-ranked content items.

21 Claims, 18 Drawing Sheets

Related U.S. Application Data application No. 18/941,657, filed on Nov. 8, 2024, and a continuation-in-part of application No. 18/921,838, filed on Oct. 21, 2024.

(60) Provisional application No. 63/666,336, filed on Jul. 1, 2024, provisional application No. 63/666,331, filed on Jul. 1, 2024, provisional application No. 63/612,634, filed on Dec. 20, 2023, provisional application No. 63/545,035, filed on Oct. 20, 2023.

(51) Int. Cl.
*G06F 16/22* (2019.01)
*G06F 16/248* (2019.01)

(56) References Cited

U.S. PATENT DOCUMENTS

| | | | |
|---|---|---|---|
| 2011/0191327 A1* | 8/2011 | Lee | G06F 16/248 707/723 |
| 2015/0046281 A1 | 2/2015 | Shivaswamy et al. | |
| 2020/0104305 A1 | 4/2020 | Wei et al. | |
| 2021/0334886 A1* | 10/2021 | Clark | G06Q 30/0633 |
| 2023/0316006 A1 | 10/2023 | Tunstall-Pedoe et al. | |
| 2024/0232199 A1 | 7/2024 | Hambardzumyan et al. | |
| 2024/0256622 A1 | 8/2024 | Abrams et al. | |
| 2024/0289407 A1 | 8/2024 | Rofouei et al. | |
| 2024/0394512 A1 | 11/2024 | Cunningham et al. | |
| 2024/0403373 A1* | 12/2024 | Chao | G06F 16/9538 |

\* cited by examiner

MULTI-DIMENSIONAL CONTENT ORGANIZATION AND ARRANGEMENT CONTROL IN A USER INTERFACE OF A COMPUTING DEVICE

CROSS-REFERENCE TO RELATED APPLICATIONS

This non-provisional application is a continuation-in-part application of U.S. nonprovisional application Ser. No. 18/921,838, filed Oct. 21, 2024, and claims priority to U.S. provisional application 63/612,634, filed Dec. 20, 2023, and to U.S. provisional application 63/545,035, filed Oct. 20, 2023. This non-provisional application is a continuation-in-part application of U.S. nonprovisional application Ser. No. 18/941,657, filed Nov. 8, 2024, and claims priority to U.S. provisional application 63/666,331, filed Jul. 1, 2024. This application is a continuation-in-part application of U.S. nonprovisional application Ser. No. 18/943,304, filed Nov. 11, 2024, and claims priority to U.S. provisional application 63/666,336, filed Jul. 1, 2024. Said referenced applications are incorporated by reference in their entirety for all purposes.

FIELD OF INVENTION

Various embodiments relate generally to search and retrieval systems, and more particularly, to systems and methods for content retrieval and content arrangement control in a user interface of a computing device.

SUMMARY

Methods, systems, and apparatus, including computer programs encoded on computer storage media relate to methods for content retrieval and content arrangement control in a user interface of a computing device.

In some embodiments, the system performs search and retrieval of content items based on an input for search criteria from a client device. A generative AI-based search retrieval system is used to retrieve content that is relevant to the received search criteria. The system creates a relevancy ranking value for each of content items that are retrieved from one more datastores.

In some embodiments, the system receives a natural language-based input associated with a client device of a user. The system generates a search criterion for the received natural language-based input. The system, via the generative AI-bases search and retrieval system, generates a relevancy-ranked output listing of content items. The relevancy-ranked output listing content items responsive to the generated search criterion content items having an associated content identifier and a content description. The system causes portions of the relevancy-ranked output listing to be rendered at the client device of the user.

In some embodiments, the system generates a structured list of content items for display by a client device. In some embodiments, the client device requests from the system retrieval of content items with the request including user interface parameters indicating the number of items and/or the number of items per group to be displayed.

In some embodiments, the system determines a number of display groupings and display slots for each display grouping and then assigns content items to the respective display slots of the display groupings.

In some embodiments, the system executes a rules processing engine that applies one or more rules to sort a relevancy ranked listing of content items. The processing engine may select a rule to apply to the listing of content items. The rule defines the criteria as to how the system should sort a content item. In some embodiments, the system applies a rule which appends a sort value to a particular content item of the relevancy ranked listing of content items. In some embodiments, the system adds a new sort dimension to the listing of content items. For example, the system may create a new dimension, such a promoted dimension, that has a sorting priority with a weight greater than a sorting priority of other created dimensions, or of other data values of the content items.

The examples and appended claims may serve as a summary of this application.

BRIEF DESCRIPTION OF THE DRAWINGS

The present invention relates generally to content generation, and more particularly, to systems and methods for providing rich media presentation of recommendations in generative media.

The present disclosure will become better understood from the detailed description and the drawings, wherein:

FIG. 8 is a diagram illustrating aspects of delivery response to a client device.

FIGS. 13A-13B are diagrams illustrating aspects of the application of multi-dimensional sorting rules.

DETAILED DESCRIPTION

Figure 1A:
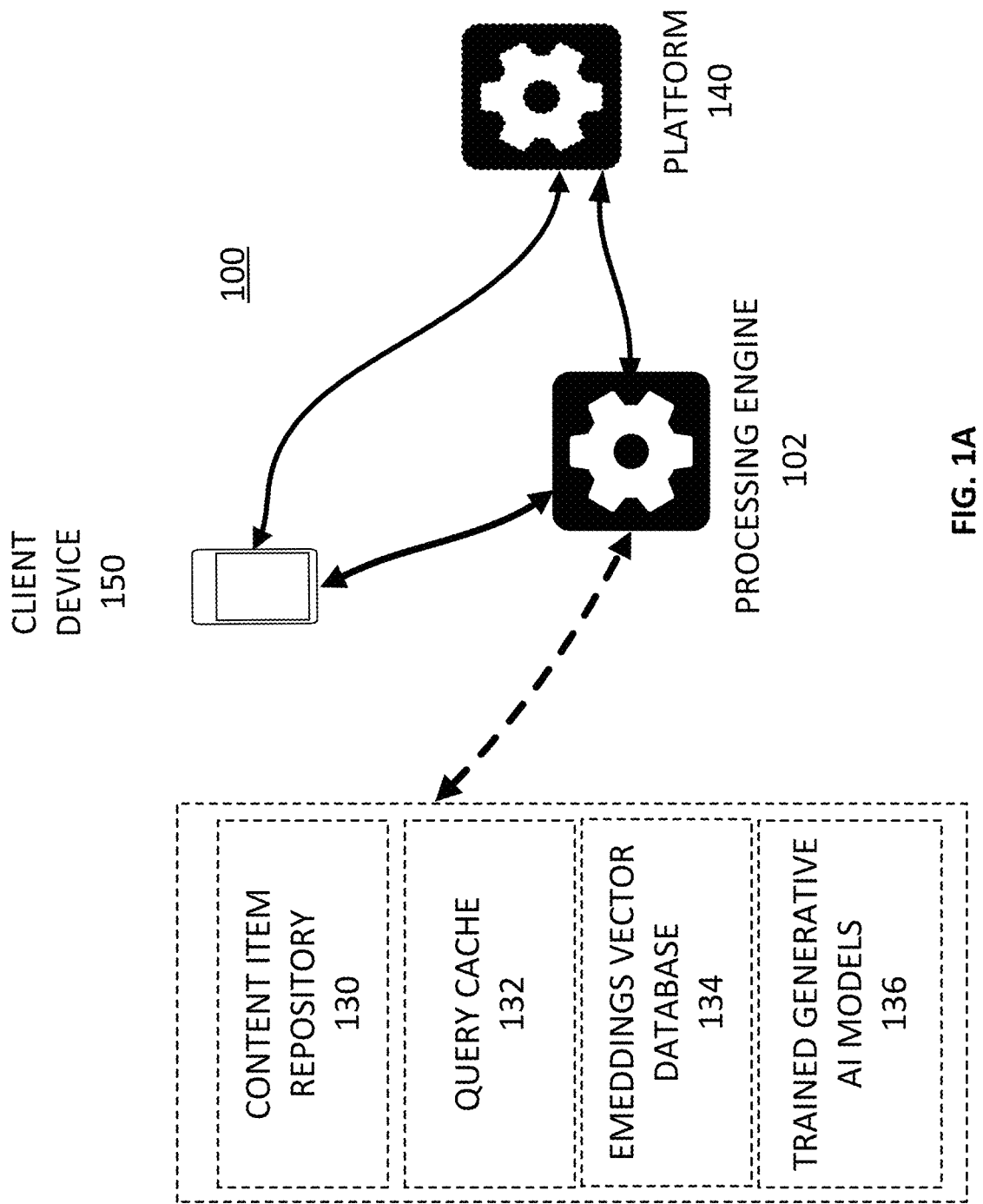
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 150, and a platform 140 are connected to a processing engine 102. The processing engine 102 is optionally connected to one or more repositories and/or databases. Such repositories and/or databases may include, for example, a content item repository 130, a query cache 132, embeddings vector database 134, and trained generative AI models 136, such as one or more foundation generative AI models and domain refined generative AI models. One or more of such repositories may be combined or split into multiple repositories. The client device 150 in this environment may be a computer, and the platform 140 and processing engine 102 may be, in whole or in part, applications or software hosted on a computer or multiple computers which are communicatively coupled via remote server or locally. In some embodiments, the embeddings vector database 134 includes at least one or more of the following: query embeddings which are historic embeddings associated with a prior user query; vector embeddings generated by the trained generative AI models; real product item listing embeddings; real document embeddings. Each of the embeddings in Vector database 134 may have an embedding type such as an image, text, multiple, etc.

The exemplary environment 100 is illustrated with only one client device, one processing engine, and one platform, though in practice there may be more or fewer additional client devices, processing engines, and/or platforms. In some embodiments, the client device, processing engine, and/or platform may be part of the same computer or device.

In an embodiment, the processing engine 102 may perform the method 200 (FIG. 2) or other method herein and, as a result, provide for rich media presentation of recommendations in generative media. In some embodiments, this may be accomplished via communication with the client device, additional client device(s), processing engine 102, platform 140, and/or other device(s) over a network between the device(s) and an application server or some other network server. In some embodiments, one or both of the processing engine 102 and platform 140 may be an application, browser extension, or other piece of software hosted on a computer or similar device, or in itself a computer or similar device configured to host an application, browser extension, or other piece of software to perform some of the methods and embodiments herein.

In some embodiments, the processing engine 102 performs processing tasks partially or entirely on the client device 102 in a manner that is local to the device and relies on the device's local processor and capabilities. In some embodiments, the processing engine 102 may perform processing tasks in a manner such that some specific processing tasks are performed locally, such as, user interface processing tasks, while other processing tasks are performed remotely via one or more connected servers, such as, media or content search and retrieval tasks. In yet other embodiments, the processing engine 102 may processing tasks entirely remotely.

In some embodiments, client device 150 may be a device with a display configured to present information to a user of the device. In some embodiments, the client device 150 presents information in the form of a user interface (UI) with UI elements or components. In some embodiments, the client device 150 sends and receives signals and/or information to the processing engine 102 pertaining to the platform. In some embodiments, client device 150 is a computer device capable of hosting and executing one or more applications or other programs capable of sending and/or receiving information. In some embodiments, the client device 150 may be a computer desktop or laptop, mobile phone, virtual assistant, virtual reality or augmented reality device, wearable, or any other suitable device capable of sending and receiving information. In some embodiments, the processing engine 102 and/or platform 140 may be hosted in whole or in part as an application or web service executed on the client device 150. In some embodiments, one or more of the platform 140, processing engine 102, and client device 150 may be the same device. In some embodiments, the platform 140 and/or the client device 150 are associated with one or more particular user accounts.

Figure 1B:
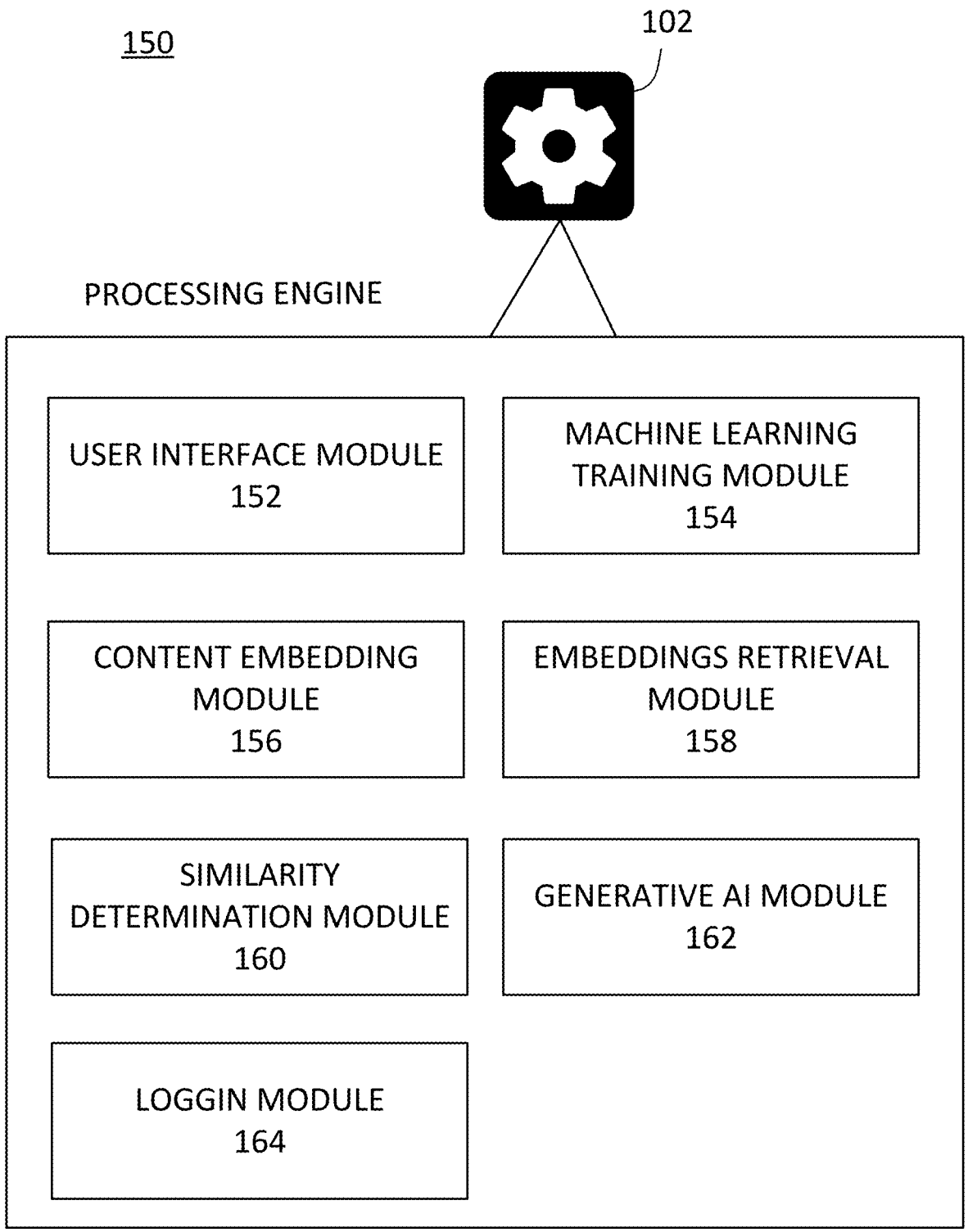
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

User interface module 152 functions to receive a user input of a search query and display the results of the search query via a user interface of the client device.

The machine learning training module 154 functions to train one or more machine learning models of the search and retrieval system.

The content embedding module 156 obtains information about real listing of items, such as images, text and/or multimedia, and generates embeddings and stores the information in a vector database.

The embeddings retrieval module 158 obtains embedding information based on an identifier, such as an item identifier, a user identifier, a query identifier or a combination thereof.

The similarity determination module 160 determines a similarity and generates a similarity score based on a type and an identifier. The system searches a vector database that has stored embedding information related to text, images and multimedia. The module determines similarity of one or more embeddings of the content item listings generated from the one or more generative AI models with one or more embeddings for real product items, real documents or other embeddings stored in the vector database.

The generative AI module 162 receives a search query via a prompter to perform a search via one or more generative AI models. The generative AI models may include a primary general generative AI model and one or more domain specific generative AI models.

The logging module 164 generates one or more logs of describing content items returned relevant to a search query.

In some embodiments, the system uses training examples that are generated from sampled live delivery logs of sets of items considered for allocation with relevance labels generated either by human reviews, LLMs, or both. These labels can be used in lieu of the inferred labels for use in allocation decisions. Where some current system relevance ranker systems return "relative" relevance ranking scores that are only meaningful in relationship to other potentially more or less relevant items to a query. However, these scores must be converted to "absolute" relevance scores for use in composite allocation systems with other factors like such as objective maximization and absolute judgements of relevance like trimmers. As such, there is a need to convert relative and subjective measures like relative similarity score rankings within a result set and number of keyword matches into judgments like the "expected relevance label for this item in this context." This system does that.

In some embodiments, the system provides functionality for in-context machine learning feature logging of allocation request. The system performs, via one or more processors of the system performs operations for the logging of and analysis of information related to a query and machine learning model generated output. In some operations, the system performs the logging of query, query context (if any) including search filters and clarifying options and conversational feedback. Alternatively, the "query" may be user preferences explicitly defined by the user or inferred from past history. The system performs operations that analyze aspects of user search queries and results generated by one more machine learning models of the system.

The system may log item information useful for understanding what that item is and its evaluation by users for suitability in a search, recommendation, or ads system; any generated machine learning features derived from the above; and/or any generated machine learning features derived from the relative distribution of features with a per-item dimension as per above. For example, a percentile of a query and item similarity score for all items considered for an allocation from a search and delivery retrieval system in the target application domain Additionally, the system may log any existing "semantic contextual relevance" relevance labels for this item in this context at this time, for example, (query, item), (query, filters, item), (user preferences, item), (user history, user preferences, item), (query, user preferences, item). Also, any inferences of such relevance labels generated by machine learning models.

For example, the system may evaluate machine learning model generated output, such as:

<query: "cat food", item: "My expensive cat food", relevance: 5: exact match>
<query: "cat food", item: "dog food A", relevance: 2: weak match>
<query: "cat food", item: "wool blanket", relevance: 1: no match>
<query: "cat food", queryContext: "chicken, order by lowest cost", item; "My expensive cat food", relevance 4: strong match>
<userPreference: "horror", userHistory: ["scream, 1 month ago"], query: "die", item "Truth or Die", relevance: 4: strong match>
<userPreference: "horror", userHistory: ["scream, 1 month ago"], query: "die", item "Die Hard", relevance: 3: moderate match>
<userPreference: "action", userHistory: ["Goldeneye, 2 months ago"], query: "die", item "Truth or Die", relevance: 3: moderate match>
<userPreference: "action", userHistory: ["Goldeneye, 2 months ago"], query: "die", item "Die Hard", relevance: 4: strong match>

Figure 2A:
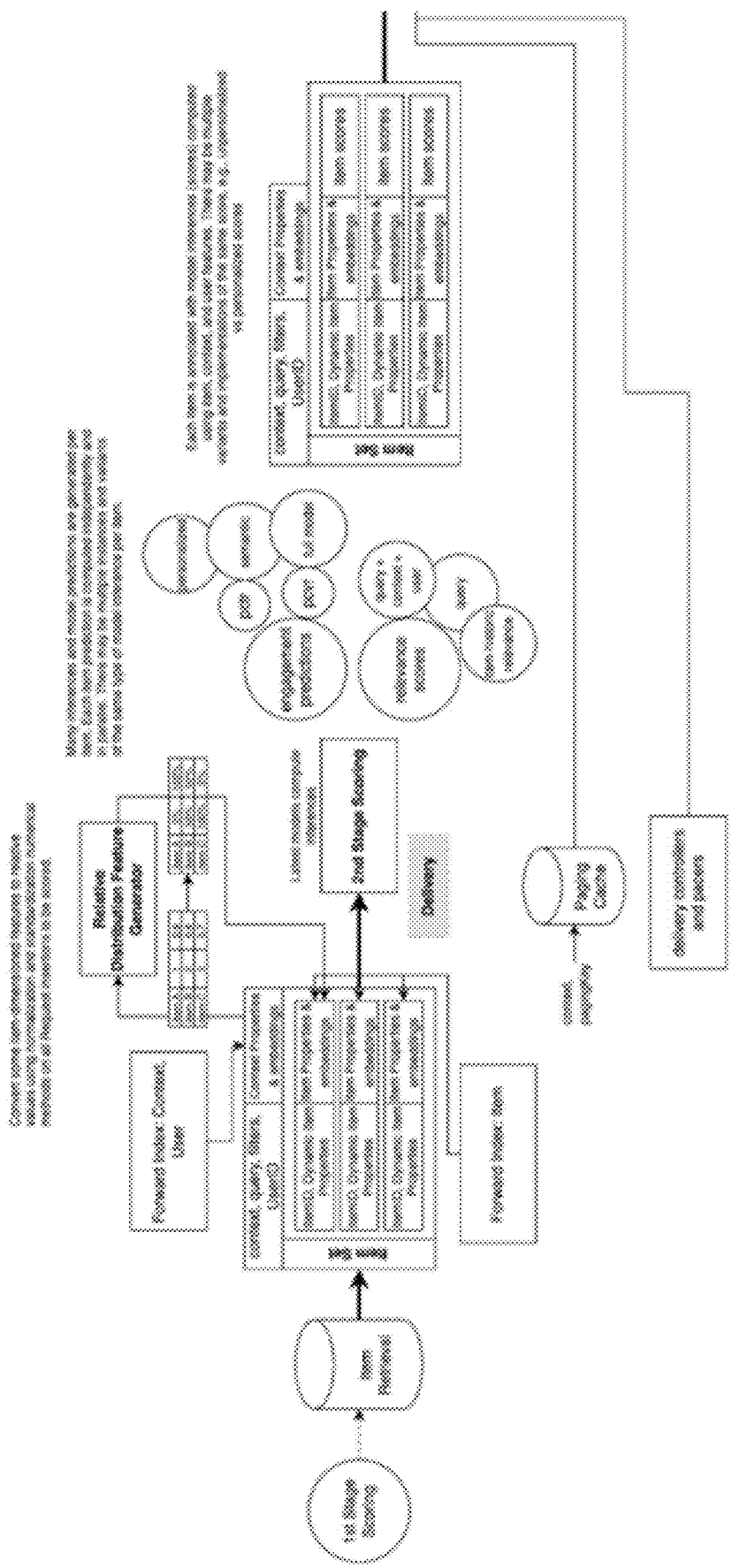
FIGS. 2A-2B is a diagram illustrating an exemplary method describing a multi-stage scoring process to determine relevant content items for retrieval using an exemplary computer system.
Figure 2B:
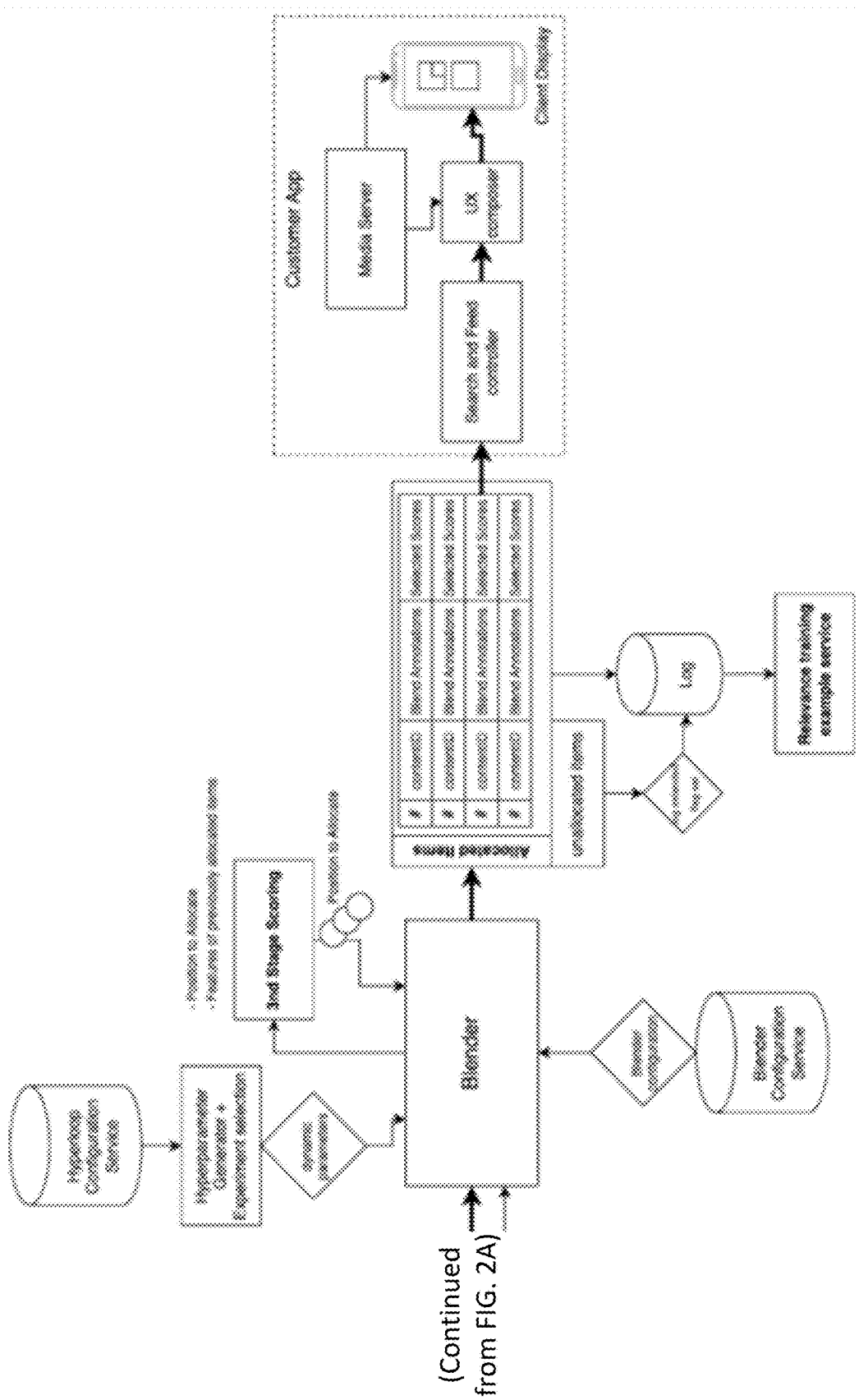

FIGS. 2A-2B are a system diagram illustrating a content retrieval system. The diagram provides an overview of data flow in the system. The content retrieval system provides functionality for a multistage ranking (i.e. scoring) process for the selection of data and content for retrieval. Request insertions flow from a 1st stage ranker retrieval system. Additional information about the user, context, and the set of content items represented by the request insertions are fetched from other services are assembled, may be transformed into distribution features, and then are sent to 2nd stage ranking process for the generation of a variety of scores generated as output from different machine learning models. These sets of scores are attached to each request insertion (referred to as execution insertions) and sent to blender process.

The blender process generates an allocation of content items. A 3rd stage scoring process may be performed by the system which re-scores the allocation of content items per each content item allocated to machine learning model interactions between content items and allocation position placements. The blender process outputs final annotated insertions which are assembled into an allocation, referred to as response insertions, along with a subset of additional annotations of the type of content item. Response insertions, without features or scores except the additional annotations, are sent to the end user display system for presentation to an end user.

The full insertions, including all features and scores, are logged for future training use. In some embodiments, Typically, only Response insertions are logged with all features, but if a flag is set, then a random set of non-allocated Execution Insertions are also logged for use in relevance model training and analytics.

Figure 3:
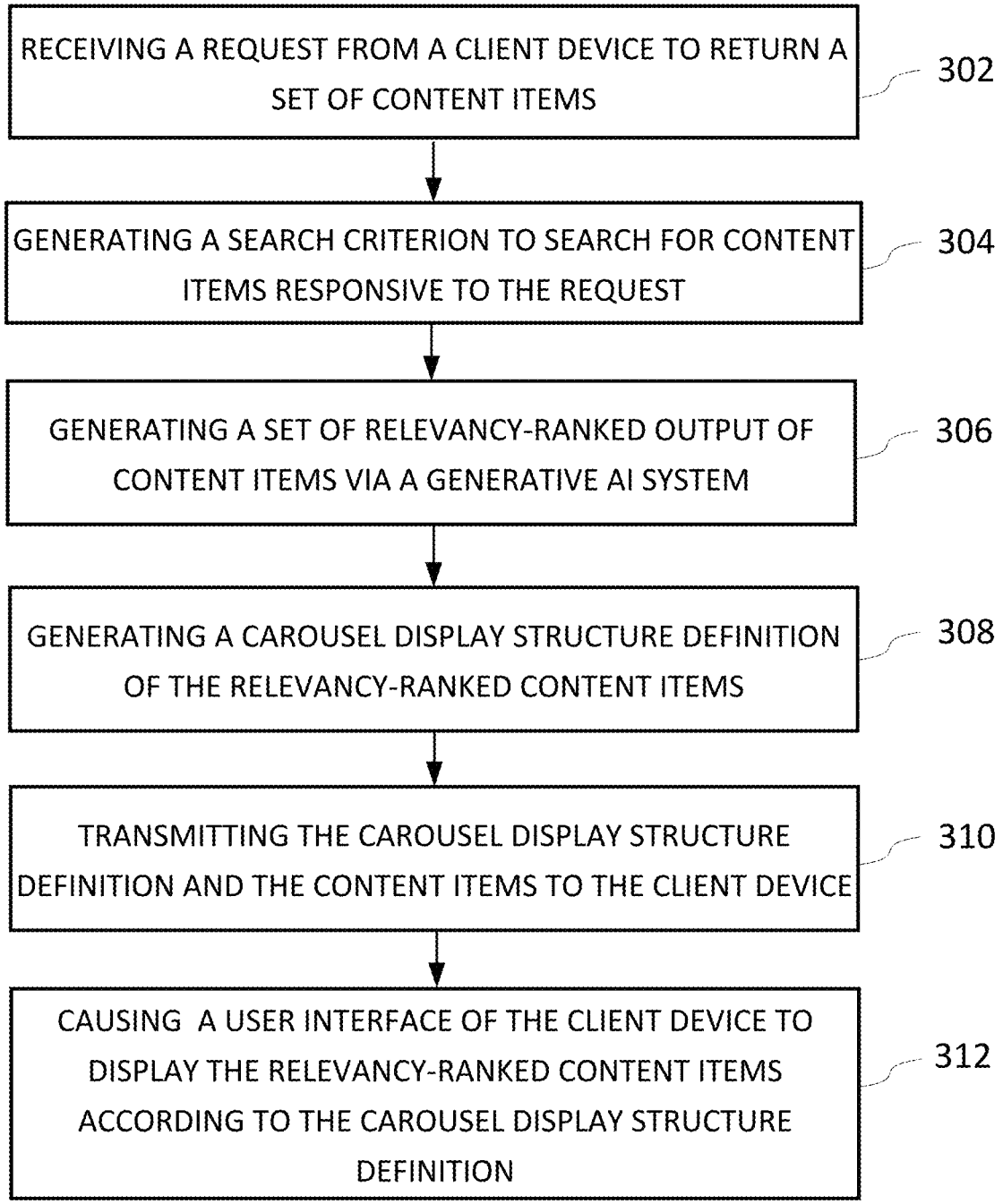
FIG. 3 is a flow chart illustrating an exemplary method that may be performed in some embodiments.

FIG. 3 is a flow chart illustrating an exemplary method 300 that may be performed in some embodiments. The method 300 may be performed by one or more processors and described aspects of the system depicted in FIGS. 2A-2B.

In step 302, the system receives a request from a client device to return a set of content items.

In step 304, the system generates a search criterion to search for content items responsive to the request.

In step 306, the system generates a set of relevancy-ranked output of content items. In some embodiments, the system performs a multiple step process that includes:

(1) causing the generated search criterion to be processed, via a generative AI search system, comprising one more machine learning models; and
(2) generating by the generative AI search system, a relevancy-ranked output listing content items responsive to the generated search criterion, wherein the content items have a content identifier and a content description.

In some embodiments, the generative AI search system performs, by the one or more processors, a search process to identify a set of content items responsive the search criterion. For example, the system generates search vector embeddings of the search criterion and performs a search using the vector embedding. The generative AI search system then performs a vector similarity matching of the search vector embedding as to a set of vector embeddings describing the content items. The generative AI search system then generates a listing of those content items where a similarity threshold match value is met or exceeded. The similarity threshold may be a predetermined value where a similarity score must match or exceed the predetermined value to determine that a particular content item is responsive to the generated search criterion.

In some embodiments, the generative AI search system performs, by the one or more processors, a first stage scoring process to generate a set of content items, and performs a second stage scoring process, by processing the set of content items by an inferencing machine learning model trained to determine item score values. The system executes the inferencing machine learning model which determines item score values for the set of content items.

In some embodiments, the generative AI search system performs, by the one or more processors, a third stage scoring process that modifies an item score value to adjust a content item position placement in the relevancy-ranked output listing.

In some embodiments, the generative AI search system performs, by the one or more processors, a blender process that generates annotations for one or more of the content items in the relevancy-ranked output listing. For example, the generated annotations comprise a type of content item for a respective content item in the relevancy-ranked output listing.

In step 308, the system generates a carousel display structure definition of the relevancy-ranked content items. In some embodiments, the system generates a carousel display structure that is used by the client device to display content-items retrieved by the generative AI search system.

In some embodiments, the system assigns a set of the relevancy-ranked content items into a predetermined number of display groupings. For example, the predetermined number includes 2 or more groupings. Each display grouping includes a predetermined number of display slots. A display slot is an ordered position in a display grouping for displaying information about a content item, such as graphical and/or textual data pertaining to a particular content item.

In some embodiments, a client application executing on the client device sends a request to the system to return a set of content items. To enhance the speed of the operation of the client application and to limit an overall number of content items returned. The client device may send as a parameter to the system along with the search request, a desired number of display grouping and/or a maximum number of groupings to be returned by the system. Moreover, the client device may send as a parameter to the system a desired number of display slots per grouping and/or a maximum number of display slots per grouping. By indication via the client application a number of display grouping and/or number of display slots per grouping the client application would receive only that number of display groupings and display slots that is needed or required by the client application.

In some embodiments, one or more processors of the system perform a process to determine a group order position for each of the display groupings. For example, the system determines a grouping score of the content items assigned to a set of a predetermined number of display slot positions for a respective display grouping. For example, the grouping score may be a value of the total sum of the relevancy value for each content item assigned to an n-number of display slots. In some embodiments, by determining a grouping score for each of the display groupings, the system determines an aggregate relevancy value for a set of content items in each display grouping.

In some embodiments, the system may then sort the display grouping according to their determined grouping score. The display order of a grouping is then assigned a grouping position for display.

In step 310, the system transmits the carousel display structure definition of the relevancy-ranked items and the content items to the client device. A carousel display structure definition is created by the system that identifies multiple display groupings, an order of each display grouping. For each display grouping, the carousel display structure definition identifies a display slot position and the content item identifier for a respective display slot position. The content items of each display grouping/display slots is then provided by the system to the client device. In some embodiments, the display grouping and their respective content items are identified in the carousel display structure definition in an order according to their determined grouping position without a grouping number position value.

In step 312, the client device displays the retrieved relevancy-ranked content items according to the carousel display structure definition. The client device generates a user interface with a display of received content items displaying multiple groupings of content items. In some embodiments, the content items are displayed in rows, where a displayed row includes a respective display grouping along with its assigned content items in a respective display slot.

Figure 4:
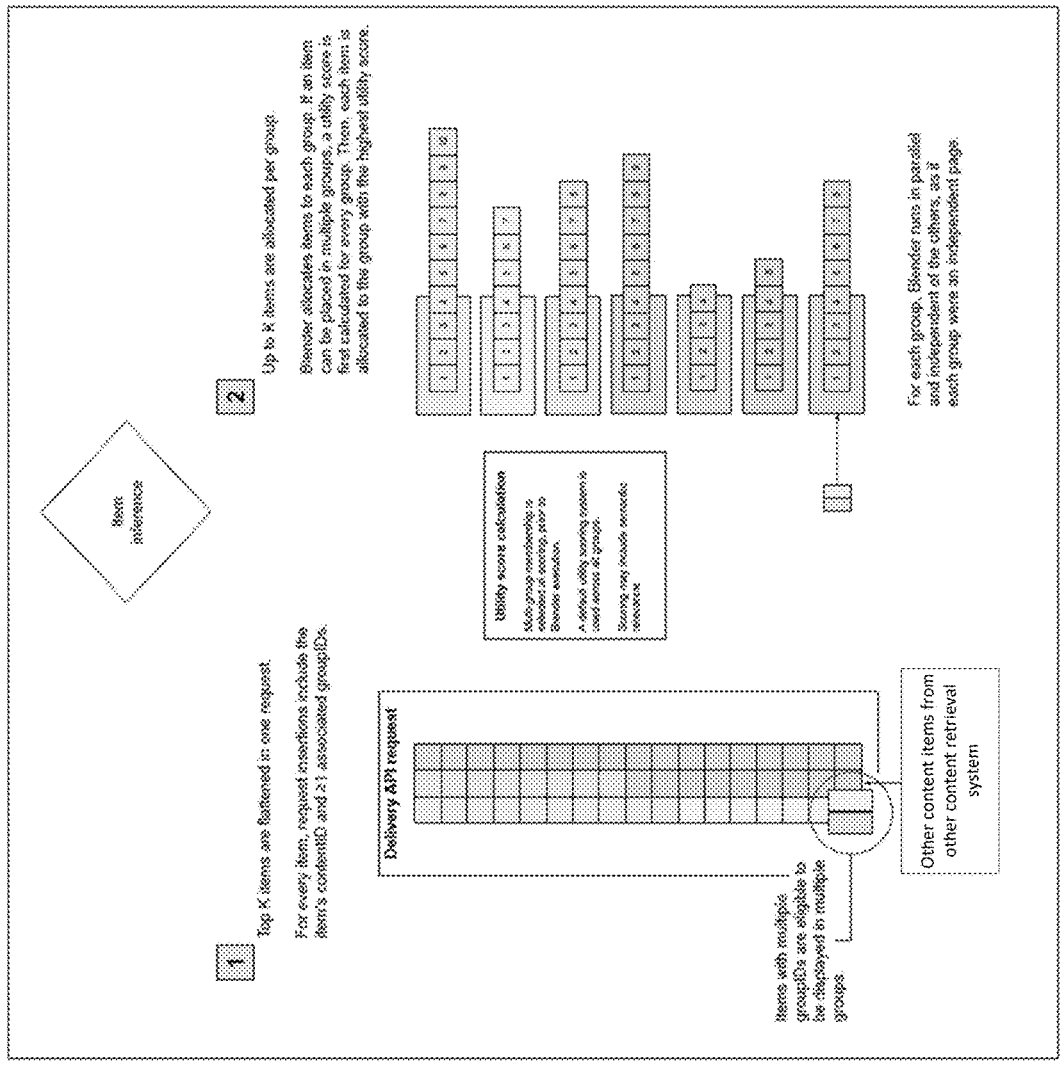
FIG. 4 is a diagram illustrating aspects of grouping of retrieved content items.

FIG. 4 is a diagram illustrating aspects of grouping of retrieved content items. The system retrieves a set of content items from a primary search retrieval system 402, such as the search and retrieval system described above with respect to FIGS. 2A-2B. Contents items from a primary search retrieval system 402 and the assigned to different display groupings. For example, the content items may be associated with a grouping identifier for an available display grouping. In some embodiments, the system may assign content items from other content retrieval systems.

Each display grouping may have a limited number of display slots in which content items are assigned. In some embodiments, the system allocates the retrieved content items to a display grouping.

In some embodiments, a specific content item could be assigned to multiple display groupings. In such a case, the system may determine a utility score for each display grouping where the content item could be assigned, and then assign the content item to the display grouping with the highest utility score.

Figure 5:
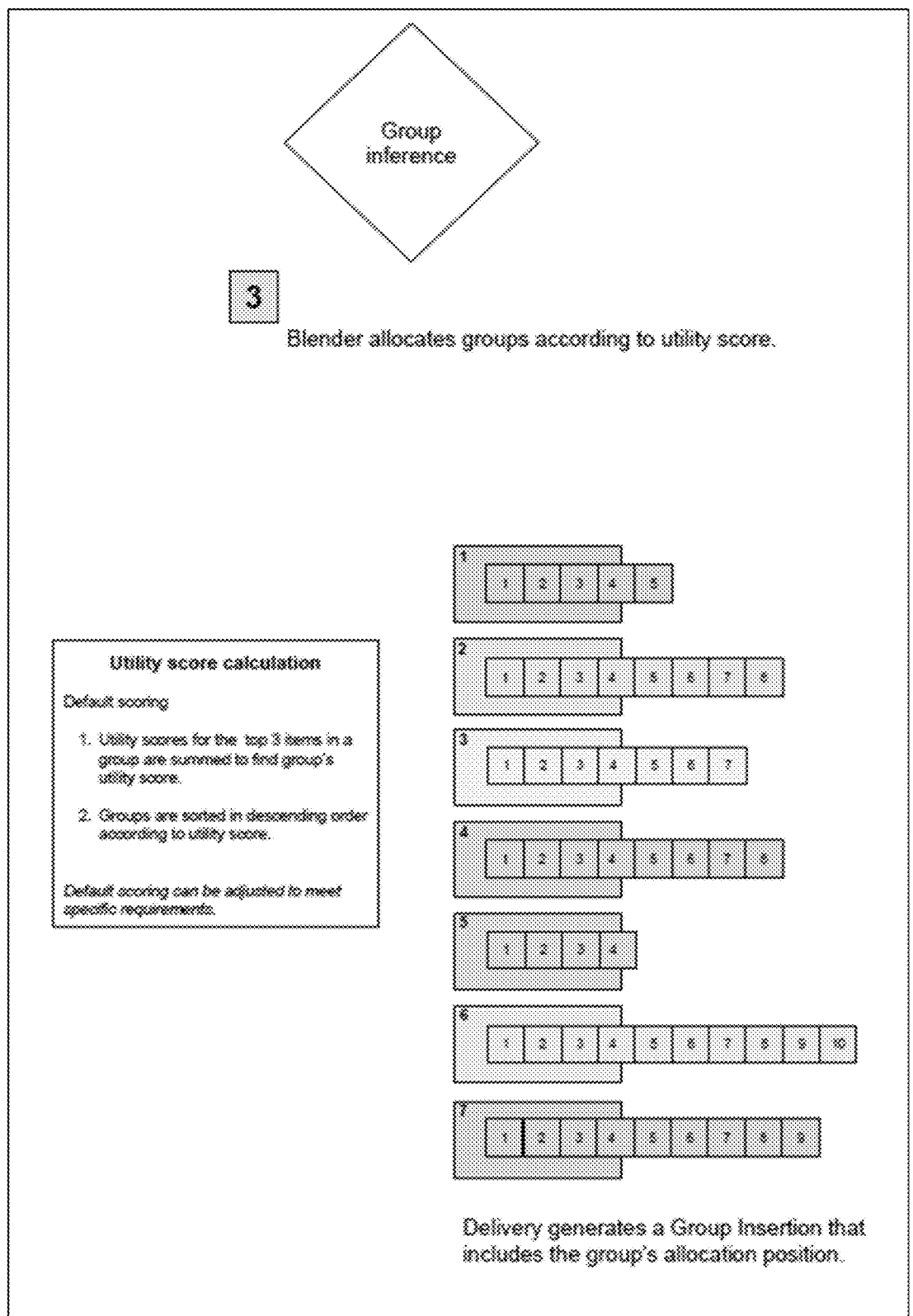
FIG. 5 is a diagram illustrating organizing a set of display groupings according to a determined grouping score.

FIG. 5 is a diagram illustrating organizing a set of display groupings according to a determined grouping score. In some embodiments, the system determines display grouping position according to a utility score. For example, the system determines a grouping score of the content items assigned to a set of a predetermined number of display slot positions for a respective display grouping. For example, the grouping score may be a value of the total sum of the relevancy value for each content item assigned to an n-number of display slots. In some embodiments, by determining a grouping score for each of the display groupings, the system determines an aggregate relevancy value for a set of content items in each display grouping.

Figure 6:
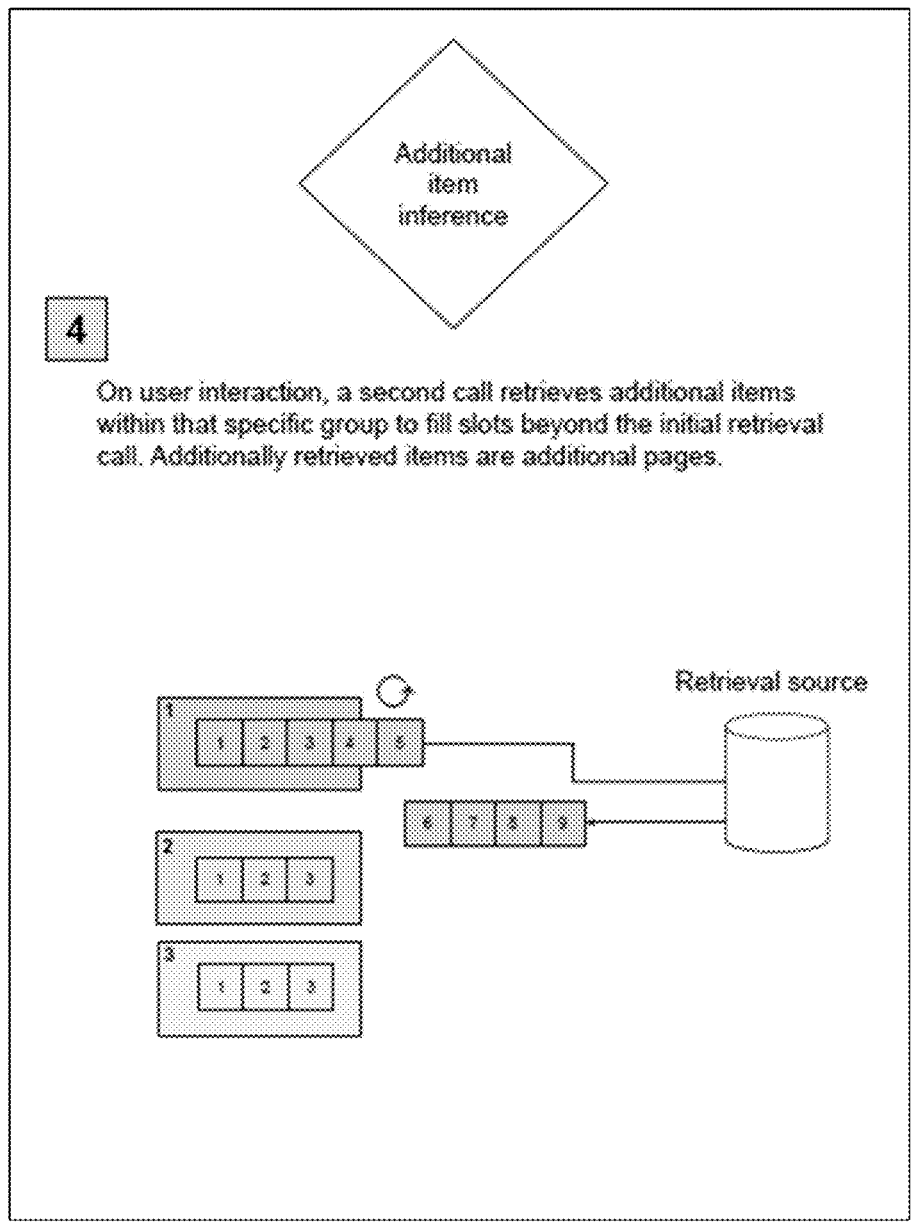
FIG. 6 is a diagram illustrating aspects of filling additional display slots of a display grouping

FIG. 6 is a diagram illustrating aspects of filling additional display slots of a display grouping. In some embodiments, the system performs additional item inference for content items. For example, the system may provide a set of content items for a display grouping to be displayed by a user interface of the client device. In some embodiments, a client application may request that additional content items be retrieved from the system. The system may generate a new search for content items that are related to the content items of a particular display grouping. In the example, display grouping 1 has display slots 1-5 associated with content items that were provided to the client application as a first response to a request for content items. The client application may request additional content items related to the display grouping 1. For example, a user may navigate, via a user interface of the client device, to the last display slot 5 which may cause the application to send a request to the system for additional content items. In response the system searches via the search and retrieval system for content items that are similar to the content items of display slots 1-5. In this example, the system returns additional content items for new display slots 6-9. The new display slots are added to the original display slots 1-5.

Figure 7:
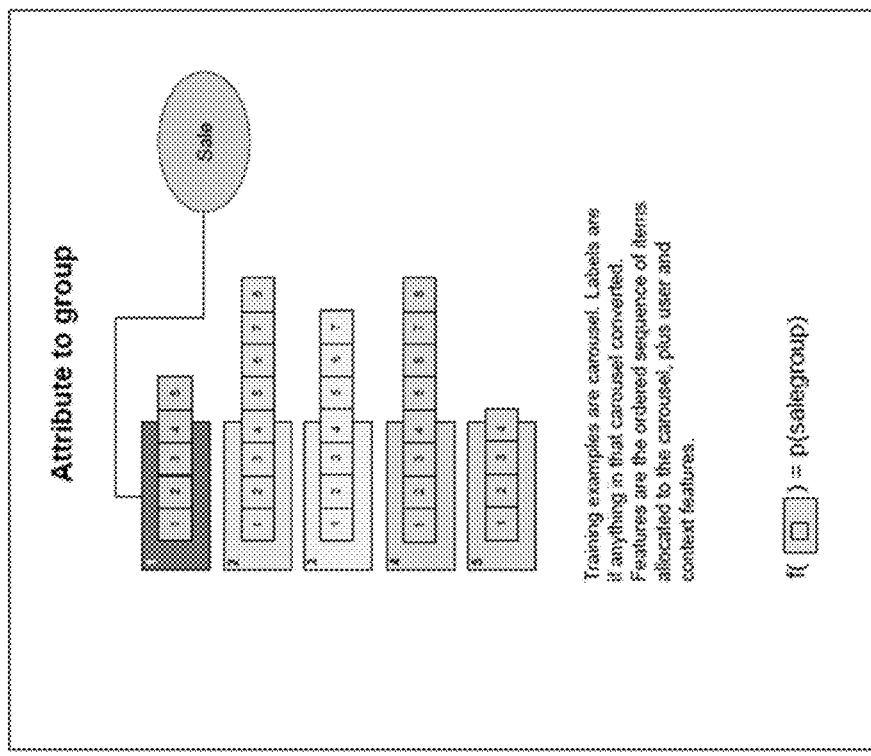
FIG. 7 is a diagram illustrating aspects of attributing items in a display grouping.
Figure 7:
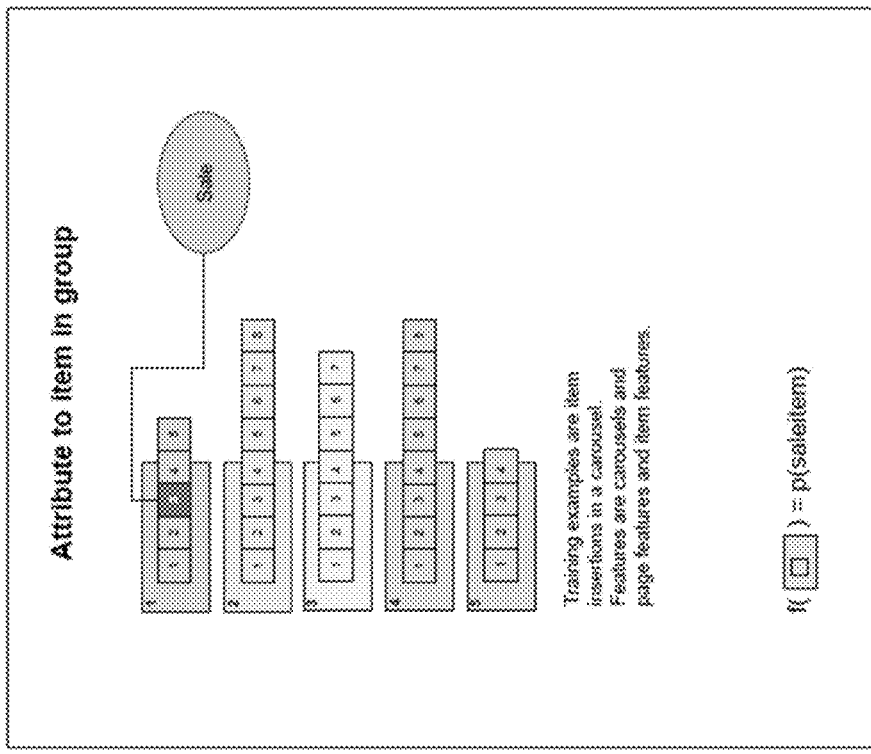

FIG. 7 is a diagram illustrating aspects of attributing items in a display grouping. In some embodiments, additional content items may be inserted into a display slot of a display grouping that were not retrieved from an initial search of the content retrieval system. In other words, the system may add content items into a display slot obtained from a subsequent search and/or from a separate content search retrieval system.

In some embodiments, a content item from another content retrieval system may be positioned into a display slot of a display grouping, prior to other content items from the initial content retrieval system be added to a display grouping. In other words, one or more display slots of one or more display groupings, may be assigned content that were retrieved from another content retrieval system. Effectively, these other content items use up or take up a space that otherwise would be filled with content items that are retrieved from the initial content retrieval system. In some embodiments, the client device may provide a parameter value indicating the number of content items from the another content retrieval system that may be combined with the content items from the initial content retrieval system.

Figure 8:
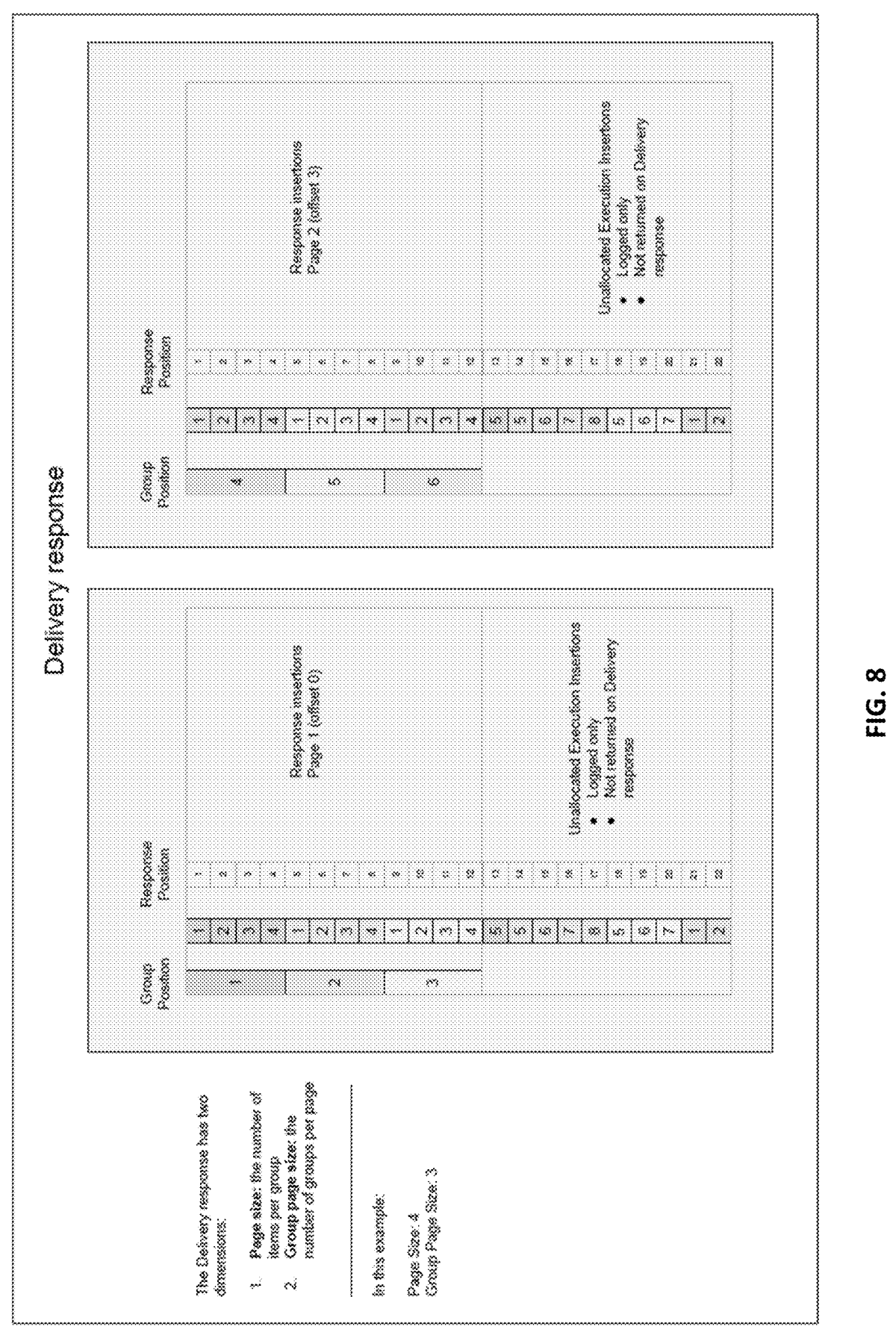

FIG. 8 is a diagram illustrating aspects of delivery response to a client device. In some embodiments, the system determines a delivery response of content items for a select group of display groupings. The system may determine an item page size and a group page size of the client device, and then determine a number of display groupings and display slots to create based on the item page size and the group page size.

In some embodiments, a content item is allowed to a particular display grouping based on an attribute associated with the content item. A content item may have an associated display grouping value indicating which display grouping to add the content item to. For example, a content item may have a preassigned display grouping value '1' indicating that the content item should be assigned to a display slot of the first display grouping. Another content item may have a preassigned display grouping value '3' indicating that the content item should be assigned to a display slot of the third display grouping.

In some embodiments, the system may limit the number of content items with a preassigned display grouping that can be added to a display grouping. For example, if a search retrieves five content items each with a preassigned display grouping of 2, the system will determine if there is a preassigned display grouping limit that has been predefined, such as a display grouping may only include 2 content items with that have a preassigned grouping value. The system will only add 2 of the five content items to the preassigned display grouping. The additional content items may be added to the next display grouping 3, or distributed to different display groupings, such as 3, 4 and 5.

Additionally, a content item may have a preassigned display slot indicating the display slot position in which the content item should be added. For example, a content item may have a preassigned display slot position value of '2' indicating that the content item should be assigned to a display slot of an assigned display grouping. In some embodiments, where a search retrieves multiple content items that are to be assigned to the same display grouping, and at the same preassigned display slot position (such as display slot 2), then the system may add the respective multiple content items in order, one after another, such the first being added to display slot position 2, then the next content item being added by the system to display slot position 3.

In some embodiments, the system may skip one or more display slot positions before adding the next content item having the same preassigned display slot position. For example, the first content item assigned to display slot position 2 may be added to display slot position 2 of the display grouping. The next content item having a preassigned display slot position of 2, may be added to display slot position 4 or 5.

In some embodiments, a content item may have one or more attributes that the system evaluates to determine the display grouping position and/or the display slot position within a display grouping. For example, the content item may have an associated attribute indicating the age of the content item (i.e., how old is the content item, or when the content item was added to the search system). If the content item is indicated as new or newer, or the amount of time that has passed since the content item was added to the search system is below a predetermined value (such as a value for a number of days), then the system may add the content item to a display grouping that is a higher position (such as 1 or 2), then an older content item that may be placed into a display grouping with a lower position. Similarly, based on this criterion of how new or old the content item is, the content item may be assigned to a display slot position. The system may determine where to assign content items based on the age or the one or more attributes to a display slot. For example, newer content items may be placed at a display slot position of or 1 or 2, and an older content item may be placed at a display slot position of 3 or 4.

Figure 9:
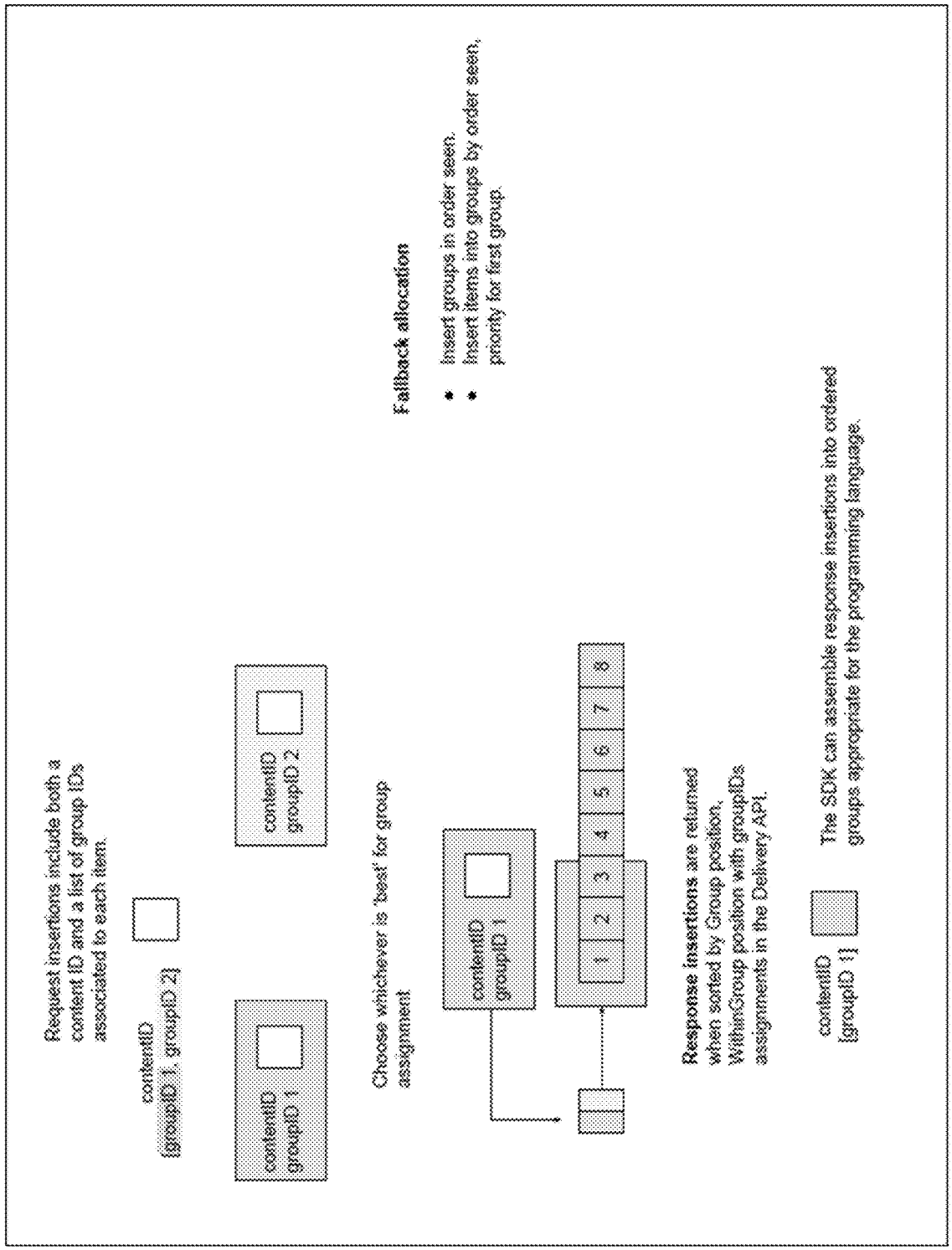
FIG. 9 is a diagram illustrating aspects of request insertions for a display grouping.

FIG. 9 is a diagram illustrating aspects of request insertions for a display grouping. In some embodiments, the system process content item request insertion for a display grouping. For example, a content item may be assigned to multiple displaying groupings. The system may determine which of the display groupings is the best display grouping for assignment of the content item.

In some embodiments, the system may reassign a display grouping position to a different display grouping position.

The system may evaluate the content items and determine a relevancy score for the aggregate content items assigned to a respective display grouping. In some instances, the order of the display groupings may be changed where a display grouping a higher relevancy score (i.e., a score indicating the relevancy of the content item to the initial search or query). For example, the assigned content items to display grouping 2 may have a higher score than the assigned content items to display grouping 1. In such a case, the system may change the initial display grouping position 1, to display grouping position 2, and change the initial display grouping position 2, to display grouping position 1.

In some embodiments, the system may remove one or more display groupings to be provided to the client device. For example, the system may perform additional operations on a display grouping to evaluate the content items assigned to the display slots. Similar to the relevancy score determination and display grouping repositioning process, the system may determine that a display grouping is to be omitted. For example, the system may determine that the display grouping relevancy score is below a threshold predetermined value. In this example, the display grouping may be omitted from the list of display grouping. In some embodiments, the content items assigned to this display grouping may be added to the other remaining display groupings.

In some embodiments, the client device may have provided a maximum number of available display grouping positions that a client application is to display via a user interface. For example, the system may receive a display grouping limit value (such as 4) from the client device. They system may retrieve content items responsive to a search, but still assign the retrieved content items to 5 or more display groupings. The system may then apply a display grouping relevancy scoring process and then select 4 display groupings to be provided to the client device.

Figure 10:
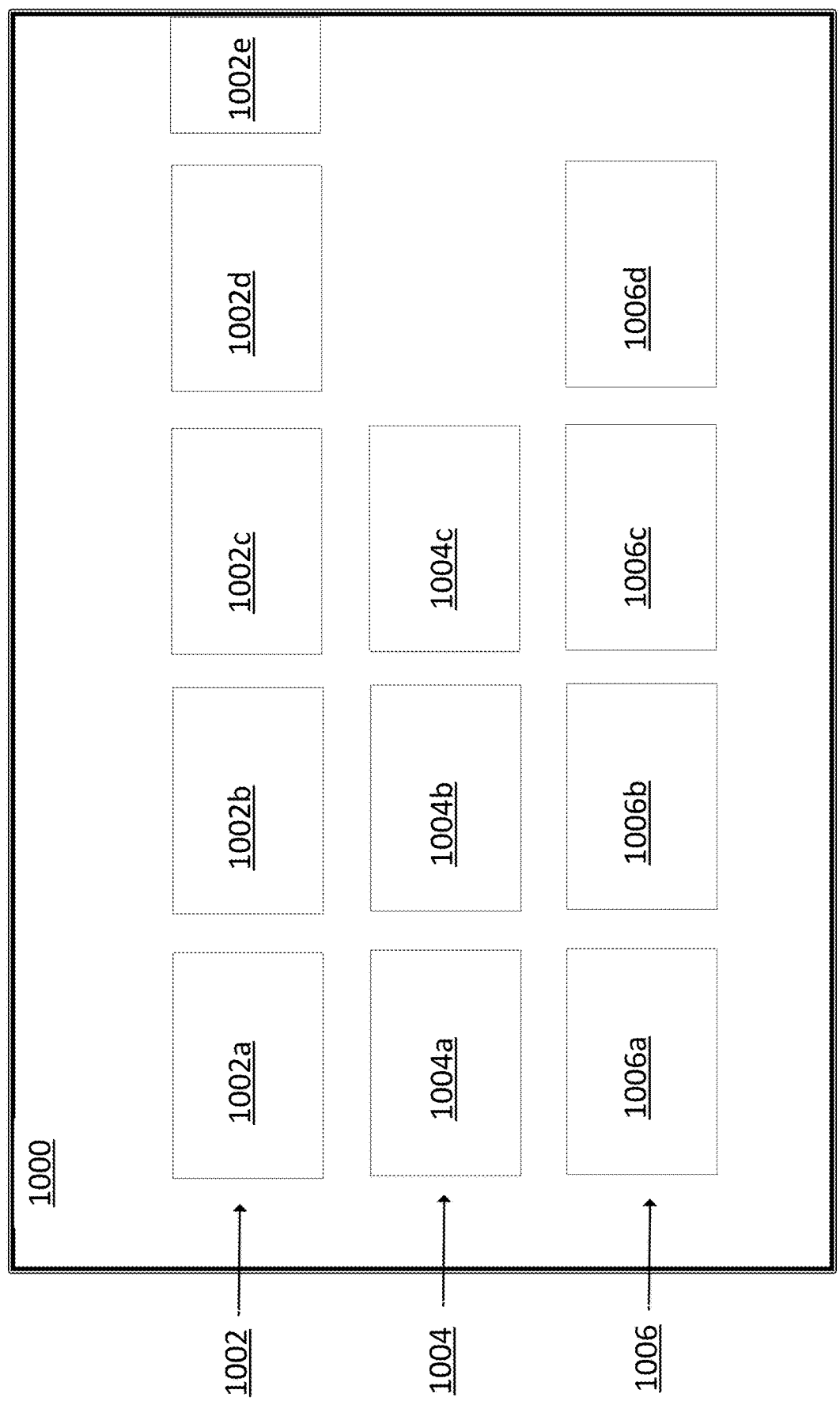
FIG. 10 is an example user interface illustrating display groupings and display slots for retrieved content items.

FIG. 10 is an example user interface 1000 illustrating display groupings and display slots for retrieved content items. A client device receives content items from the search and retrieval system and displays the content items according to a display grouping order with content items display in a display slot order. In the example user interface 1000, three display groupings are depicted 1002, 1004, 1006. The display grouping 1002 has 5 display slots 1002a, 1002b, 1002c, 1002d and 1002e. The display grouping 1004 has 3 display slots 1004a, 1004b, 1004c. The display grouping 1006 has 4 display slots 1006a, 1006b, 1006c and 1006d. Each display slot includes a graphical and/or textual representation of a content item provided by the system. In some embodiments, a user may navigate via the user interface 1000 and select a display slot (such as through mouse or touch input). In response, the user interface 1000 displays additional information related to the content item. In some embodiments, a user may navigate a display grouping and slide the display content items to the right or left. In some embodiments, when the last content item is displayed, the user application send a request to the system for additional content items, which are then added as display slots to the display grouping that was being interacted with via the user interface.

Multi-Dimensional Content Item Ordering

In some embodiments, the system provides functionality such that an allocation position has a multi-dimensional "sort key" function, where higher dimensions have precedence over lower sort dimensions and lower dimensions decide ties between higher dimensions. In some embodiments, the system performs a stratify sort first by semantic relevancy to a query or context, and then by expected revenue from a listing sale. This is in contrast to most state-of-the-art commercial media optimization systems, which blend together "relevancy" and "expected value" considerations into a single "utility" or "search ranking" or "ads ranking" score.

The system executes a rules processing engine that applies one or more rules to sort a relevancy ranked listing of content items. The processing engine may select a rule to apply to the listing of content items. The rule defines the criteria as to how the system should sort a content item. In some embodiments, the system applies a rule which appends a sort value to a particular content item of the relevancy ranked listing of content items. In some embodiments, the system adds a new sort dimension to the listing of content items. For example, the system may create a new dimension, such a promoted dimension, that has a sorting priority with a weight greater than a sorting priority of other created dimensions, or of other data values of the content items.

In some modes of operation, the system injects into the content listing a number of promoted slots and/or novelty slots. The number of injected promoted slots may be based on the overall number of content items in the listing. For example, the system may inject a promoted slot and/or a novelty slot for every n number of content items in the listing. Moreover, the system may use a predefined number of promoted slots to inject into the content listing. For example, the system may inject a total of 3 promoted slots. The promoted slots may be associated with an existing content item in the content listing and/or the system may inject new content items into the content listing along with the promoted slots. In some embodiments, the system injects fewer novelty slots than promoted slots.

In some embodiments, the system generates a prompt for execution by an LLM or generative AI subsystem. The system provides the content listing and instructions to apply the multi-dimensional sorting rules to the content listing. The system receives as an output from the LLM a new data set that includes a sorted content listing that includes additional sorting values for the promoted slots and/or the novelty slots. The received sorted content listing may then be display via a user interface according to processes as described herein.

Figure 11:
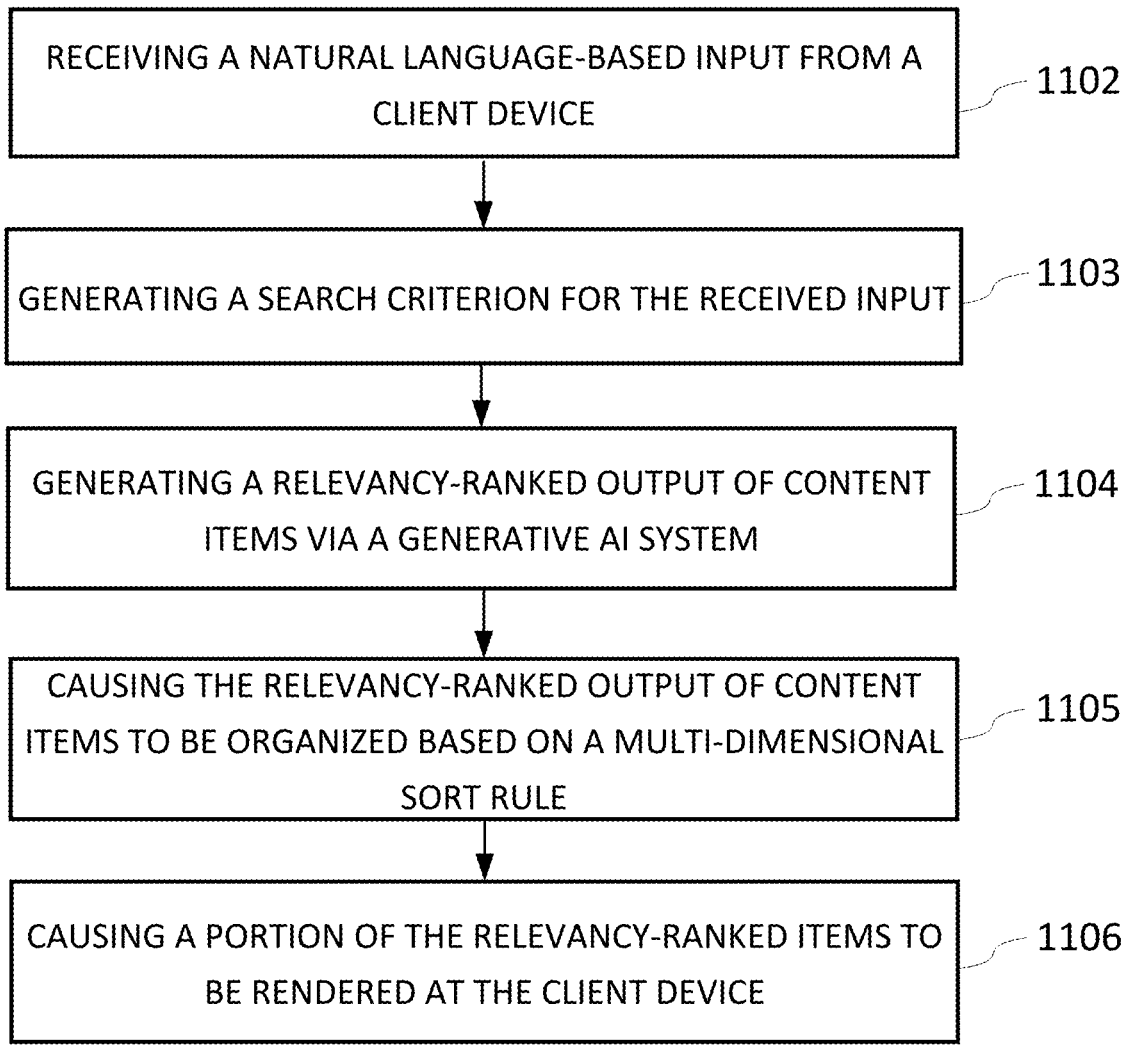
FIG. 11 is a flow chart illustrating an exemplary method that may be performed in some embodiments.

FIG. 11 is a flow chart illustrating an exemplary method 100 that may be performed in some embodiments. The method 1100 may be performed by one or more processors and described aspects of the system depicted in FIGS. 2A-2B.

In step 1102, the system receives a request from a client device to return a set of content items.

In step 1103, the system generates a search criterion to search for content items responsive to the request.

In step 1104, the system generates a set of relevancy-ranked output of content items. In some embodiments, the system performs a multiple step process that includes:
  (1) causing the generated search criterion to be processed, via a generative AI search system, comprising one more machine learning models; and
  (2) generating by the generative AI search system, a relevancy-ranked output listing content items responsive to the generated search criterion, wherein the content items have a content identifier and a content description.

In some embodiments, the generative AI search system performs, by the one or more processors, a search process to identify a set of content items responsive the search criterion. For example, the system generates search vector embeddings of the search criterion and performs a search using the vector embedding. The generative AI search system then performs a vector similarity matching of the search vector embedding as to a set of vector embeddings describing the content items. The generative AI search system then generates a listing of those content items where a similarity threshold match value is met or exceeded. The similarity threshold may be a predetermined value where a similarity score must match or exceed the predetermined value to determine that a particular content item is responsive to the generated search criterion.

In some embodiments, the generative AI search system performs, by the one or more processors, a first stage scoring process to generate a set of content items, and performs a second stage scoring process, by processing the set of content items by an inferencing machine learning model trained to determine item score values. The system executes the inferencing machine learning model which determines item score values for the set of content items.

In some embodiments, the generative AI search system performs, by the one or more processors, a third stage scoring process that modifies an item score value to adjust a content item position placement in the relevancy-ranked output listing.

In some embodiments, the generative AI search system performs, by the one or more processors, a blender process that generates annotations for one or more of the content items in the relevancy-ranked output listing. For example, the generated annotations comprise a type of content item for a respective content item in the relevancy-ranked output listing.

In step 1105, the system causes the relevancy-ranked output of content items to be organized based on one or more multi-dimensional sort rules that are applied to the relevancy-ranked output listing.

In step 1106, the organized relevancy-ranked items are rendered at a client device. In some embodiments, the steps 308-312 (see FIG. 3) are performed in this step to generate a carousel display structure definition of the organized relevancy-ranked items for display via a carousel user interface control structure. In some embodiments, the system causes the client device to render, via a user interface, at least a portion of the organized relevancy-ranked items. For example, the client device generates graphical elements using an onboard processor to render the user interface.

Each position may have a different sort key definition depending on a configuration system that itself may be optimized. For example, certain positions are reserved for Promoted Slots, which uses an advertiser bid sort key instead of a standard user experience or revenue optimization sort key. Which positions get the "ad" sort key versus the "regular" sort key is determined by an optimized "blender" rule system. Other position rules like "new listing" or "revenue maximizer," or "exact match" or any other configuration are possible.

The allocation function no longer uses a strict, single-value ordering concept for computing competitive ad auction pricing, as used in Generalized Second-Price (GSP) auctions. The invention includes an extension to compute "Vickrey-Clarke-Groves" (VCG) auction pricing by first computing and delivering the optimal allocation, compute the sum total of the expected value of that allocation, and then for each winning advertiser in the optimal allocation, to exclude all ads for that advertiser and repeat the allocation. For each such "counter-factual" allocation, recompute the optimal allocation without all ads from that advertiser and compute the counter-factual allocation expected value. The difference between the maximum expected allocation value and the not greater counterfactual expected allocation value computed per advertiser is the "displaced value" and is charged to each advertiser as the ad price.

Figure 12:
FIG. 12 is a diagram illustrating aspect of the application of multi-dimensional sorting rules.

Referring to FIG. 12, the figure depicts an example of a simple multi-dimensional sorting rule. A simple example of up to 3 dimensions of a sort key is illustrated. The default sort key in this example is first used by the system to sort by "relevance" (1: high relevance, 0: some relevance, −1: low relevance) content items and then by other associated values, such as expected sales value in reverse order. Some positions have different sort keys to prioritize different types of content items. In Position 4, a "Promoted Slot" adds a higher dimension sort key for "Is Promoted" for position 4 only. This results in an item that is otherwise less relevant to be allocated sooner than it normally would. Likewise, in Slot 6, a "Challenger Slot" prioritizes sufficiently new items to be allocated first, even though the expected sales value is out-of-order from when it normally would be allocated.

Figure 13A:
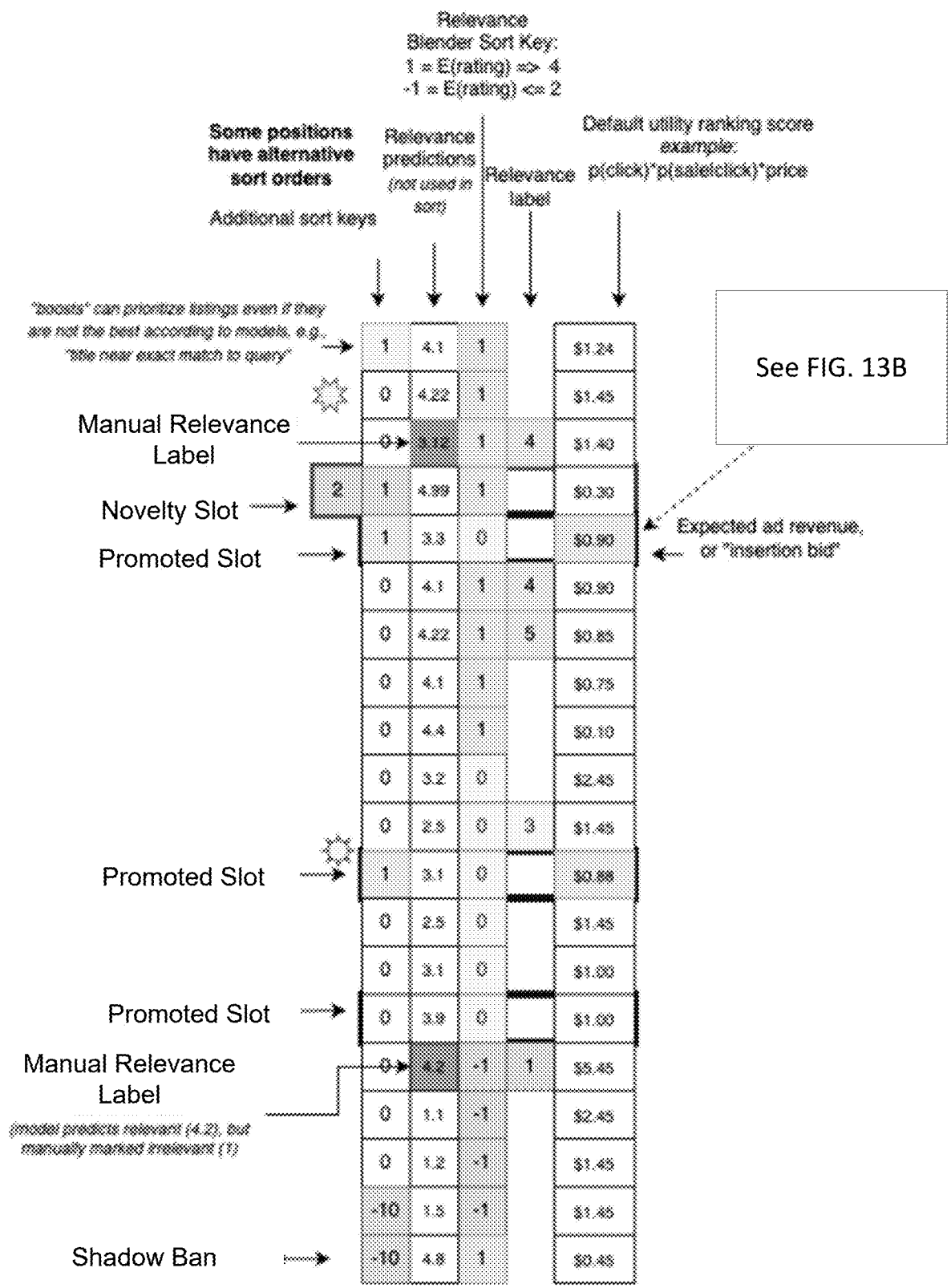
Figure 13B:
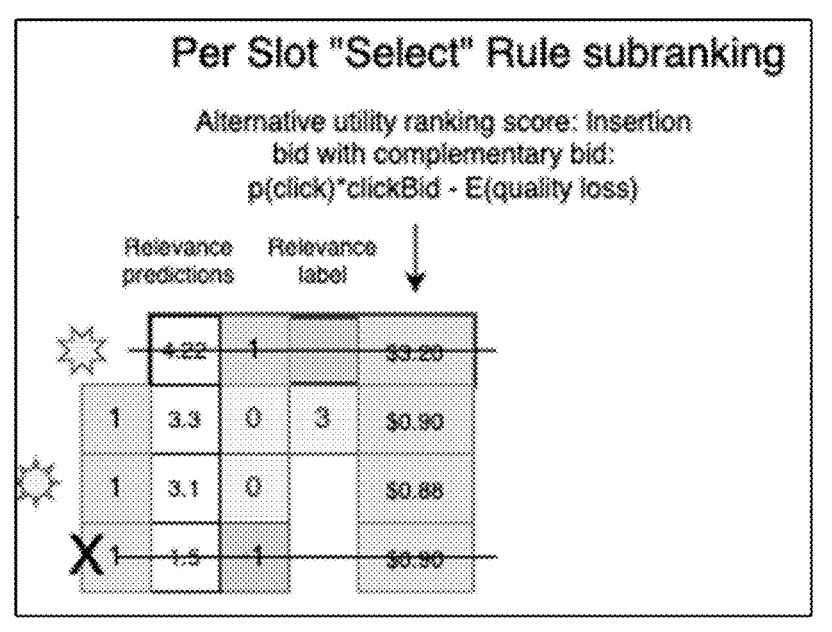

Referring to FIGS. 13A-13B, the figures depict a more complex example of multiple dimensions and multiple position-dependent sort keys.

In some embodiments, any position can be allocated with a different sort order. For example, the "Novelty" Slot reranks all eligible items to prioritize new content items first. The item with the number 2 would not be sorted in the initial or default sort order.

In some embodiments, the system uses a Promoted Slot. For example, the second item in the example ad auction has not yet been allocated in a higher priority slot. As such, the content item is eligible for allocation in a second instance of the Promoted Slot. Each slot with the same rule may have rankings regenerated when allocation to account for previously allocated items and update inference scores due to features form previously allocated items.

In some embodiments, the system uses a predetermined number of Promoted Slots for reranking a content item to a higher priority slot.

In some embodiments, a rule is applied to a content item such that the content item is ranked at the end of the list of the content items. Applying this rule would likely cause the particular content item to not be displayed via a user interface.

In some embodiments, a Manual Relevance label effectively overrides a relevance label generated by the system. For example, the system may have generated a relevance label of 4, but a prior manual label of 3.12 was assigned.

In some embodiments, the system may apply a rule that creates a shadow ban value that is applied as a sort key for a content item. The shadow ban value causes the system to sort the shadow banned item at the end of the listing of content items effectively preventing the time from being displayed via the user interface. The shadow ban sorts triggered items last even if they have high quality otherwise (e.g., seller cancelations are too high).

Referring to FIG. 13B, a per slot "select" rule subranking process is described. In some embodiments, the system perform a rule engine that selects and applies a rule to the content items where an item is already allocated. In such cases, the content item may be excluded from a position, and another content item may be selected. For example, the top row item would have had the highest rank (winning the ad auction), but is already allocated. In this case, the system excludes the time from ad pricing.

In some embodiments, "select" rules like this per-position sort order for the ad auction can mark some items not yet allocated as ineligible. For example, the X item would have been promoted, but it is too irrelevant, so the "promoted"

selector is removed, and would not be allocated by the rule. It also is excluded from ad pricing.

Figure 14:
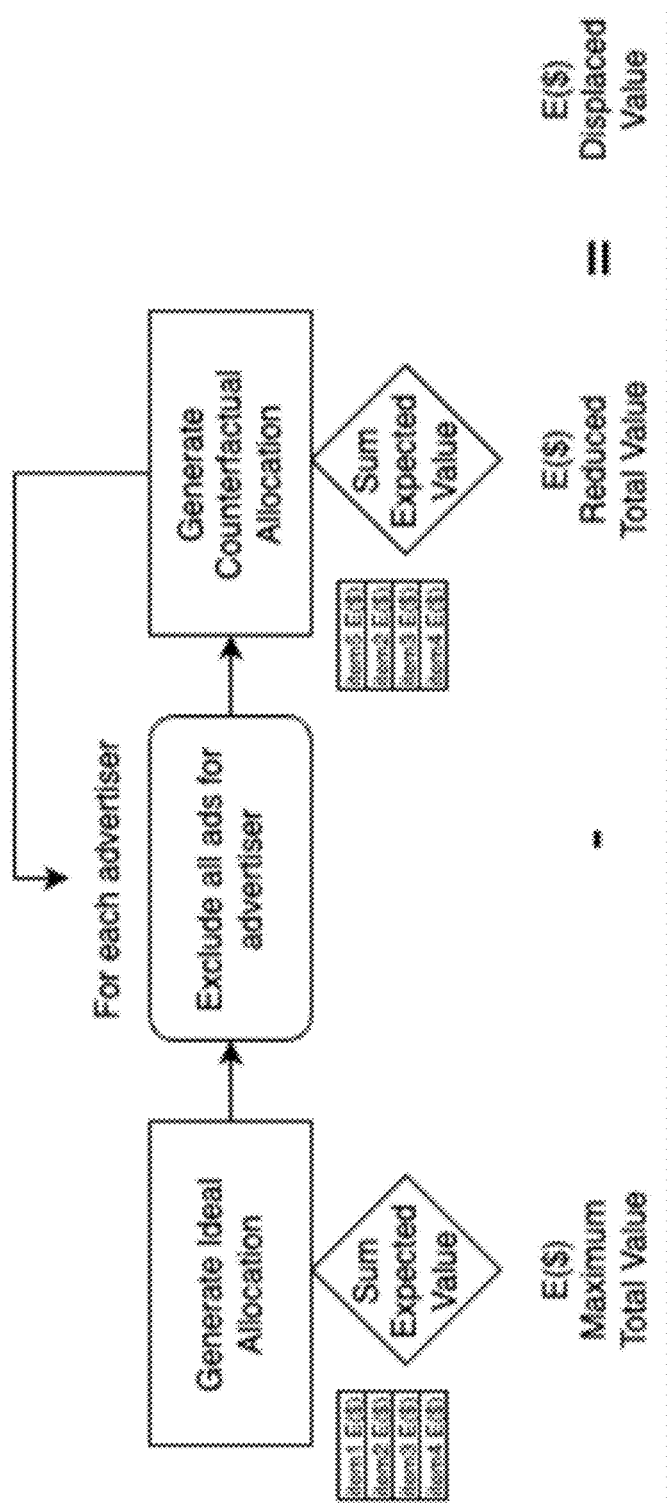
FIG. 14 is a diagram illustrating a process of reorganizing a list of content items according to the application of multi-dimensional sorting rules.

FIG. 14 is a workflow diagram of a VCG ad auction process where the blender sub-system where there is no longer any single ordering of items to be used to compute ad auction prices. Here the system uses the multi-dimensional sorting rules to further refine or organize the sorting or display order of the content items prior to displaying the content items via a user interface. The workflow exemplifies content items being generated by the processed described above initially with a generated ideal allocation of content items. When the multi-dimensional sorting rules are applied to the listing of content items (e.g., item 1, item 2, item 3, item 4), the content item are sorted are ranked differently (e.g., item 5, item 2, item 3, item 4).

Figure 15:
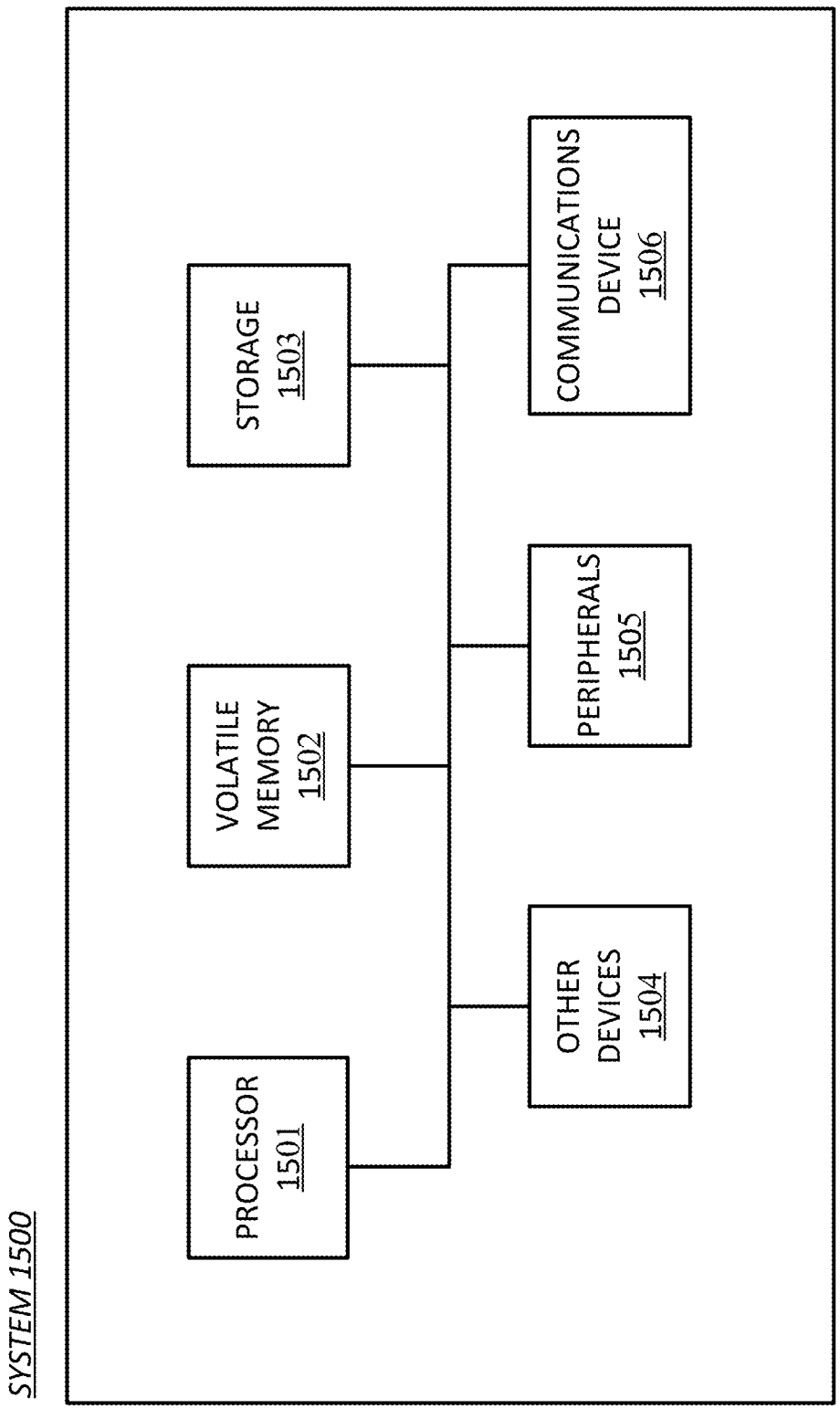
FIG. 15 is a diagram illustrating an exemplary computer that may perform processing in some embodiments.

FIG. 15 is a diagram illustrating an exemplary computer that may perform processing in some embodiments. Exemplary computer 1500 may perform operations consistent with some embodiments. The architecture of computer 1500 is exemplary. Computers can be implemented in a variety of other ways. A wide variety of computers can be used in accordance with the embodiments herein.

Processor 1501 may perform computing functions such as running computer programs. The volatile memory 1502 may provide temporary storage of data for the processor 1501. RAM is one kind of volatile memory. Volatile memory typically requires power to maintain its stored information. Storage 1503 provides computer storage for data, instructions, and/or arbitrary information. Non-volatile memory, which can preserve data even when not powered and including disks and flash memory, is an example of storage. Storage 1503 may be organized as a file system, database, or in other ways. Data, instructions, and information may be loaded from storage 1503 into volatile memory 15102 for processing by the processor 1501.

The computer 1500 may include peripherals 1505. Peripherals 1505 may include input peripherals such as a keyboard, mouse, trackball, video camera, microphone, and other input devices. Peripherals 1505 may also include output devices such as a display. Peripherals 1505 may include removable media devices such as CD-R and DVD-R recorders/players. Communications device 1506 may connect the computer 1500 to an external medium. For example, communications device 1506 may take the form of a network adapter that provides communications to a network. A computer 1500 may also include a variety of other devices 1504. The various components of the computer 1500 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

Example set. It will be appreciated that the present disclosure may include any one and up to all of the following examples:

Example 1. A computer-implemented method performed by one or more processors, comprising the operations of: receiving a request from a client device to return a set of content items; generating, by the one or more processors, a search criterion to search for content items responsive to the request; generating, by the one or more processors, relevancy-ranked content items, via a generative AI search and retrieval system; generating, by the one or more processors, a carousel display structure of the relevancy-ranked content items; transmitting the carousel display structure definition of the relevancy-ranked content items and the content items to the client device; and causing a user interface of the client device to display the relevancy-ranked content items to display the relevancy-ranked content items according to the carousel display structure definition.

Example 2. The computer-implemented method of Example 1, wherein generating the carousel display structure definition of the relevancy-ranked content items comprises: assigning a set of the relevancy-ranked content items into a predetermined number of display groupings, wherein the predetermined number includes 2 or more groupings, and wherein each display grouping includes a predetermined number of display slots, wherein a display slot is an ordered position in a display grouping.

Example 3. The computer-implemented method of any one of Examples 1-2, further comprising: determining a group order position for each of the display groupings by: determining a grouping score of the content items assigned to a set of a predetermined number of display slot positions for a respective display grouping; and sorting the display grouping according to the determined grouping score.

Example 4. The computer-implemented method of any one of Examples 1-3, wherein generating the relevancy-ranked output comprises: causing the generated search criterion to be processed, via the generative AI search and retrieval system, comprising one more machine learning models; and generating by the generative AI search and retrieval system, a relevancy-ranked output listing content items responsive to the generated search criterion, wherein the content items have a content identifier and a content description.

Example 5. The computer-implemented method of any one of Examples 1-4, wherein causing the generated search criterion to be processed, via a search system, comprises the operations of: performing, by the one or more processors, a first stage scoring process, to generate a set of content items; and performing, by the one or more processors, a second stage scoring process, by processing the set of content items by an inferencing machine learning model trained to determine item score values; and generating, by the inferencing machine learning model, item score values for the set of content items.

Example 6. The computer-implemented method of any one of Examples 1-5, further comprising the operations of: performing, by the one or more processors, a third stage scoring process that modifies an item score value to adjust a content item position placement in the relevancy-ranked output listing.

Example 7. The computer-implemented method of any one of Examples 1-6, further comprising the operations of: performing, by the one or more processors, a blender process that generates annotations for one or more of the content items in the relevancy-ranked output listing, wherein the generated annotations comprise a type of content item for a respective content item in the relevancy-ranked output listing.

Example 8. A system comprising one or more processors configured to perform the operations of: receiving a request from a client device to return a set of content items; generating, by the one or more processors, a search criterion to search for content items responsive to the request; generating, by the one or more processors, relevancy-ranked content items, via a generative AI search and retrieval system; generating, by the one or more processors, a carousel display structure of the relevancy-ranked content items; transmitting the carousel display structure definition of the relevancy-ranked content items and the content items to the client device; and causing a user interface of the client device to display the relevancy-ranked content items to display the relevancy-ranked content items according to the carousel display structure definition.

Example 9. The system of any one of Example 8, wherein generating the carousel display structure definition of the relevancy-ranked content items comprises: assigning a set of the relevancy-ranked content items into a predetermined number of display groupings, wherein the predetermined number includes 2 or more groupings, and wherein each display grouping includes a predetermined number of display slots, wherein a display slot is an ordered position in a display grouping.

Example 10. The system of any one of Examples 8-9, further comprising: determining a group order position for each of the display groupings by: determining a grouping score of the content items assigned to a set of a predetermined number of display slot positions for a respective display grouping; and sorting the display grouping according to the determined grouping score.

Example 11. The system of any one of Examples 8-10, wherein generating the relevancy-ranked output comprises: causing the generated search criterion to be processed, via the generative AI search and retrieval system, comprising one more machine learning models; and generating by the generative AI search and retrieval system, a relevancy-ranked output listing content items responsive to the generated search criterion, wherein the content items have a content identifier and a content description.

Example 12. The system of any one of Examples 8-11, wherein causing the generated search criterion to be processed, via a search system, comprises the operations of: performing, by the one or more processors, a first stage scoring process, to generate a set of content items; and performing, by the one or more processors, a second stage scoring process, by processing the set of content items by an inferencing machine learning model trained to determine item score values; and generating, by the inferencing machine learning model, item score values for the set of content items.

Example 13. The system of any one of Examples 8-12, further comprising the operations of: performing, by the one or more processors, a third stage scoring process that modifies an item score value to adjust a content item position placement in the relevancy-ranked output listing Example 14. The system of any one of Examples 8-13, further comprising the operations of: performing, by the one or more processors, a blender process that generates annotations for one or more of the content items in the relevancy-ranked output listing, wherein the generated annotations comprise a type of content item for a respective content item in the relevancy-ranked output listing.

Example 15. A non-transitory computer readable medium storing a software program comprising data and computer implementable instructions that when executed by at least one processor cause the at least one processor to perform operations of: receiving a request from a client device to return a set of content items; generating, by the one or more processors, a search criterion to search for content items responsive to the request; generating, by the one or more processors, relevancy-ranked content items, via a generative AI search and retrieval system; generating, by the one or more processors, a carousel display structure of the relevancy-ranked content items; transmitting the carousel display structure definition of the relevancy-ranked content items and the content items to the client device; and causing a user interface of the client device to display the relevancy-ranked content items to display the relevancy-ranked content items according to the carousel display structure definition.

Example 16. The non-transitory computer readable medium of Example 15, wherein generating the carousel display structure definition of the relevancy-ranked content items comprises: assigning a set of the relevancy-ranked content items into a predetermined number of display groupings, wherein the predetermined number includes 2 or more groupings, and wherein each display grouping includes a predetermined number of display slots, wherein a display slot is an ordered position in a display grouping.

Example 17. The non-transitory computer readable medium of any one of Examples 15-16, further comprising the operations of: determining a group order position for each of the display groupings by: determining a grouping score of the content items assigned to a set of a predetermined number of display slot positions for a respective display grouping; and sorting the display grouping according to the determined grouping score.

Example 18. The non-transitory computer readable medium of any one of Examples 15-17, wherein generating the relevancy-ranked output comprises: causing the generated search criterion to be processed, via the generative AI search and retrieval system, comprising one more machine learning models; and generating by the generative AI search and retrieval system, a relevancy-ranked output listing content items responsive to the generated search criterion, wherein the content items have a content identifier and a content description.

Example 19. The non-transitory computer readable medium of any one of Examples 15-18, wherein causing the generated search criterion to be processed, via a search system, comprises the operations of: performing, by the one or more processors, a first stage scoring process, to generate a set of content items; and performing, by the one or more processors, a second stage scoring process, by processing the set of content items by an inferencing machine learning model trained to determine item score values; and generating, by the inferencing machine learning model, item score values for the set of content items.

Example 20. The non-transitory computer readable medium of any one of Examples 15-19, further comprising the operations of: performing, by the one or more processors, a third stage scoring process that modifies an item score value to adjust a content item position placement in the relevancy-ranked output listing.

Example 21. The non-transitory computer readable medium of any one of Examples 15-120, further comprising the operations of: performing, by the one or more processors, a blender process that generates annotations for one or more of the content items in the relevancy-ranked output listing, wherein the generated annotations comprise a type of content item for a respective content item in the relevancy-ranked output listing.

Example 22. A computer-implemented method performed by one or more processors, comprising the operations of: receiving a request from a client device to return a set of content items; generating, by the one or more processors, a search criterion to search for content items responsive to the request; generating, by the one or more processors, a first set of relevancy-ranked content items, via a generative AI search and retrieval system; executing, by the one or more processors, one or more multidimensional sorting rules to the first set of relevancy-ranked content items, and generating a second set of relevancy-ranked content items having a different sorted order than the first set of relevancy-ranked content items, wherein one of the multidimensional sorting rules includes a promoted slot selector that modifies a sort order of a promoted content item; generating, by the one or more processors, a display structure of the second set of relevancy-ranked content items; and rendering, via a user interface of the client device, at least a portion of the second set of relevancy-ranked content items according to the display structure definition.

Example 23. The computer-implemented method of Example 22, wherein generating the carousel display structure definition of the second set of relevancy-ranked content items comprises: assigning the second set relevancy-ranked content items into a predetermined number of display groupings, wherein the predetermined number includes 2 or more groupings, and wherein each display grouping includes a predetermined number of display slots, wherein a display slot is an ordered position in a display grouping.

Example 24. The computer-implemented method of any one of Example 22-23, further comprising: determining a group order position for each of the display groupings by: determining a grouping score of the second set of relevancy-ranked content items assigned to a set of a predetermined number of display slot positions for a respective display grouping; and sorting the display grouping according to the determined grouping score.

Example 25. The computer-implemented method of any one of Example 22-24, wherein generating the first set of relevancy-ranked output comprises: causing the generated search criterion to be processed, via the generative AI search and retrieval system, comprising one more machine learning models; and generating by the generative AI search and retrieval system, a relevancy-ranked output listing of content items responsive to the generated search criterion, wherein the content items of the output listing each have a content identifier and a content description.

Example 26. The computer-implemented method of any one of Example 22-25, wherein causing the generated search criterion to be processed, via a search system, comprises the operations of: performing, by the one or more processors, a first stage scoring process, to generate an initial set of content items; and performing, by the one or more processors, a second stage scoring process, by processing the initial set of content items by an inferencing machine learning model trained to determine content item score values; and generating, by the inferencing machine learning model, item score values for the initial set of content items.

Example 27. The computer-implemented method of any one of Example 22-26, further comprising the operations of: performing, by the one or more processors, a third stage scoring process that modifies an item score value to adjust a content item position placement in the first set of relevancy-ranked output listing.

Example 28. The computer-implemented method of any one of Example 22-27, further comprising the operations of: performing, by the one or more processors, a blender process that generates annotations for one or more of the content items in the relevancy-ranked output listing, wherein the generated annotations comprise a type of content item for a respective content item in the relevancy-ranked output listing.

Example 29. A system comprising one or more processors configured to perform the operations of: receiving a request from a client device to return a set of content items; generating, by the one or more processors, a search criterion to search for content items responsive to the request; generating, by the one or more processors, a first set of relevancy-ranked content items, via a generative AI search and retrieval system; executing, by the one or more processors, one or more multidimensional sorting rules to the first set of relevancy-ranked content items, and generating a second set of relevancy-ranked content items having a different sorted order than the first set of relevancy-ranked content items, wherein one of the multidimensional sorting rules includes a promoted slot selector that modifies a sort order of a promoted content item; generating, by the one or more processors, a display structure of the second set of relevancy-ranked content items; and rendering, via a user interface of the client device, at least a portion of the second set of relevancy-ranked content items according to the display structure definition.

Example 30. The system of Example 29, wherein generating the carousel display structure definition of the second set of relevancy-ranked content items comprises: assigning the second set relevancy-ranked content items into a predetermined number of display groupings, wherein the predetermined number includes 2 or more groupings, and wherein each display grouping includes a predetermined number of display slots, wherein a display slot is an ordered position in a display grouping.

Example 31. The system of any one of Examples 29-30, further comprising: determining a group order position for each of the display groupings by: determining a grouping score of the second set of relevancy-ranked content items assigned to a set of a predetermined number of display slot positions for a respective display grouping; and sorting the display grouping according to the determined grouping score.

Example 32. The system of any one of Examples 29-31, wherein generating the first set of relevancy-ranked output comprises: causing the generated search criterion to be processed, via the generative AI search and retrieval system, comprising one more machine learning models; and generating by the generative AI search and retrieval system, a relevancy-ranked output listing of content items responsive to the generated search criterion, wherein the content items of the output listing each have a content identifier and a content description.

Example 33. The system of any one of Examples 29-32, wherein causing the generated search criterion to be processed, via a search system, comprises the operations of: performing, by the one or more processors, a first stage scoring process, to generate an initial set of content items; and performing, by the one or more processors, a second stage scoring process, by processing the initial set of content items by an inferencing machine learning model trained to determine content item score values; and generating, by the inferencing machine learning model, item score values for the initial set of content items.

Example 34. The system of any one of Examples 29-33, further comprising the operations of performing, by the one or more processors, a third stage scoring process that modifies an item score value to adjust a content item position placement in the first set of relevancy-ranked output listing.

Example 35. The system of any one of Examples 29-34, further comprising the operations of: performing, by the one or more processors, a blender process that generates annotations for one or more of the content items in the relevancy-ranked output listing, wherein the generated annotations comprise a type of content item for a respective content item in the relevancy-ranked output listing.

Example 36. A non-transitory computer readable medium storing a software program comprising data and computer implementable instructions that when executed by at least one processor cause the at least one processor to perform operations of: receiving a request from a client device to return a set of content items; generating, by the one or more processors, a search criterion to search for content items responsive to the request; generating, by the one or more processors, a first set of relevancy-ranked content items, via a generative AI search and retrieval system; executing, by the one or more processors, one or more multidimensional sorting rules to the first set of relevancy-ranked content items, and generating a second set of relevancy-ranked content items having a different sorted order than the first set of relevancy-ranked content items, wherein one of the multidimensional sorting rules includes a promoted slot selector that modifies a sort order of a promoted content item; generating, by the one or more processors, a display structure of the second set of relevancy-ranked content items; and rendering, via a user interface of the client device, at least a portion of the second set of relevancy-ranked content items according to the display structure definition.

Example 38. The non-transitory computer readable medium of Example 37, wherein generating the carousel display structure definition of the second set of relevancy-ranked content items comprises: assigning the second set relevancy-ranked content items into a predetermined number of display groupings, wherein the predetermined number includes 2 or more groupings, and wherein each display grouping includes a predetermined number of display slots, wherein a display slot is an ordered position in a display grouping.

Example 39. The non-transitory computer readable medium of any one of Examples 37-38, further comprising: determining a group order position for each of the display groupings by: determining a grouping score of the second set of relevancy-ranked content items assigned to a set of a predetermined number of display slot positions for a respective display grouping; and sorting the display grouping according to the determined grouping score.

Example 40. The non-transitory computer readable medium of any one of Examples 37-39, wherein generating the first set of relevancy-ranked output comprises: causing the generated search criterion to be processed, via the generative AI search and retrieval system, comprising one more machine learning models; and generating by the generative AI search and retrieval system, a relevancy-ranked output listing of content items responsive to the generated search criterion, wherein the content items of the output listing each have a content identifier and a content description.

Example 41. The non-transitory computer readable medium of any one of Examples 37-40, wherein causing the generated search criterion to be processed, via a search system, comprises the operations of: performing, by the one or more processors, a first stage scoring process, to generate an initial set of content items; and performing, by the one or more processors, a second stage scoring process, by processing the initial set of content items by an inferencing machine learning model trained to determine content item score values; and generating, by the inferencing machine learning model, item score values for the initial set of content items.

Example 42. The non-transitory computer readable medium of any one of Examples 37-41, further comprising the operations of: performing, by the one or more processors, a third stage scoring process that modifies an item score value to adjust a content item position placement in the first set of relevancy-ranked output listing.

Example 43. The non-transitory computer readable medium of any one of Examples 37-42, further comprising the operations of: performing, by the one or more processors, a blender process that generates annotations for one or more of the content items in the relevancy-ranked output listing, wherein the generated annotations comprise a type of content item for a respective content item in the relevancy-ranked output listing.

What is claimed is:

1. A computer-implemented method performed by one or more processors, comprising the operations of:
   receiving a request from a client device to return a set of content items;
   generating, by the one or more processors, a search criterion to search for content items responsive to the request;
   generating, by the one or more processors, a first set of relevancy-ranked content items, via a generative Artificial Intelligence (AI) search and retrieval system;
   executing, by the one or more processors, one or more multidimensional sorting rules to the first set of relevancy-ranked content items, and generating a second set of relevancy-ranked content items having a different sorted order than the first set of relevancy-ranked content items, wherein one of the multidimensional sorting rules includes a promoted slot selector that modifies a sort order of a promoted content item, wherein one or more of the content items of the first relevancy ranked content items have a display slot position that has been changed to a different display slot position for the same content items of the second set of relevancy-ranked content items;
   generating, by the one or more processors, a carousel display structure definition of the second set of relevancy-ranked content items, wherein the carousel display structure definition identifies multiple display groupings and an order of each display grouping for the relevancy-ranked content items, and wherein the second set of relevancy-ranked content items have an associated display grouping value and a display slot position; and
   rendering, via a user interface of the client device, at least a portion of the second set of relevancy-ranked content items in the respective multiple display groupings and the display slot positions according to the display structure definition.

2. The computer-implemented method of claim 1, wherein generating the carousel display structure definition of the second set of relevancy-ranked content items comprises:
   assigning the second set relevancy-ranked content items into a predetermined number of display groupings, wherein the predetermined number of display groupings includes 2 or more groupings, and wherein each display grouping includes a predetermined number of display slots, wherein a display slot is an ordered position in a display grouping.

3. The computer-implemented method of claim 2, further comprising:
   determining a group order position for each of the display groupings by:
      determining a grouping score of the second set of relevancy-ranked content items assigned to a set of a predetermined number of display slot positions for a respective display grouping; and
      sorting the display grouping according to the determined grouping score.

4. The computer-implemented method of claim 1, wherein generating the first set of relevancy-ranked output comprises:
   causing the generated search criterion to be processed, via the generative AI search and retrieval system, comprising one more machine learning models; and
   generating by the generative AI search and retrieval system, a relevancy-ranked output listing of content items responsive to the generated search criterion, wherein the content items of the output listing each have a content identifier and a content description.

5. The computer-implemented method of claim 1, wherein causing the generated search criterion to be processed, via a search system, comprises the operations of:
   performing, by the one or more processors, a first stage scoring process, to generate an initial set of content items; and
   performing, by the one or more processors, a second stage scoring process, by processing the initial set of content items by an inferencing machine learning model trained to determine content item score values; and
   generating, by the inferencing machine learning model, item score values for the initial set of content items.

6. The computer-implemented method of claim 5, further comprising the operations of:
   performing, by the one or more processors, a third stage scoring process that modifies an item score value to adjust a content item position placement in the first set of relevancy-ranked output listing.

7. The computer-implemented method of claim 5, further comprising the operations of:
   performing, by the one or more processors, a blender process that generates annotations for one or more of the content items in the relevancy-ranked output listing, wherein the generated annotations comprise a type of content item for a respective content item in the relevancy-ranked output listing.

8. A system comprising one or more processors configured to perform the operations of:
   receiving a request from a client device to return a set of content items;
   generating, by the one or more processors, a search criterion to search for content items responsive to the request;
   generating, by the one or more processors, a first set of relevancy-ranked content items, via a generative Artificial Intelligence (AI) search and retrieval system;
   executing, by the one or more processors, one or more multidimensional sorting rules to the first set of relevancy-ranked content items, and generating a second set of relevancy-ranked content items having a different sorted order than the first set of relevancy-ranked content items, wherein one of the multidimensional sorting rules includes a promoted slot selector that modifies a sort order of a promoted content item, wherein one or more of the content items of the first relevancy ranked content items have a display slot position that has been changed to a different display slot position for the same content items of the second set of relevancy-ranked content items;
   generating, by the one or more processors, a carousel display structure definition of the second set of relevancy-ranked content items, wherein the carousel display structure definition identifies multiple display groupings and an order of each display grouping for the relevancy-ranked content items, and wherein the second set of relevancy-ranked content items have an associated display grouping value and a display slot position; and rendering, via a user interface of the client device, at least a portion of the second set of relevancy-ranked content items in the respective multiple display groupings and the display slot positions according to the display structure definition.

9. The system of claim 8, wherein generating the carousel display structure definition of the second set of relevancy-ranked content items comprises:

assigning the second set relevancy-ranked content items into a predetermined number of display groupings, wherein the predetermined number of display groupings includes 2 or more groupings, and wherein each display grouping includes a predetermined number of display slots, wherein a display slot is an ordered position in a display grouping.

10. The system of claim 9, further comprising:

determining a group order position for each of the display groupings by:

determining a grouping score of the second set of relevancy-ranked content items assigned to a set of a predetermined number of display slot positions for a respective display grouping; and sorting the display grouping according to the determined grouping score.

11. The system of claim 8, wherein generating the first set of relevancy-ranked output comprises:

causing the generated search criterion to be processed, via the generative AI search and retrieval system, comprising one more machine learning models; and generating by the generative AI search and retrieval system, a relevancy-ranked output listing of content items responsive to the generated search criterion, wherein the content items of the output listing each have a content identifier and a content description.

12. The system of claim 8, wherein causing the generated search criterion to be processed, via a search system, comprises the operations of:

performing, by the one or more processors, a first stage scoring process, to generate an initial set of content items; and performing, by the one or more processors, a second stage scoring process, by processing the initial set of content items by an inferencing machine learning model trained to determine content item score values; and generating, by the inferencing machine learning model, item score values for the initial set of content items.

13. The system of claim 12, further comprising the operations of:

performing, by the one or more processors, a third stage scoring process that modifies an item score value to adjust a content item position placement in the first set of relevancy-ranked output listing.

14. The system of claim 12, further comprising the operations of:

performing, by the one or more processors, a blender process that generates annotations for one or more of the content items in the relevancy-ranked output listing, wherein the generated annotations comprise a type of content item for a respective content item in the relevancy-ranked output listing.

15. A non-transitory computer readable medium storing a software program comprising data and computer implementable instructions that when executed by at least one processor cause the at least one processor to perform operations of:

receiving a request from a client device to return a set of content items;

generating, by the one or more processors, a search criterion to search for content items responsive to the request;

generating, by the one or more processors, a first set of relevancy-ranked content items, via a generative Artificial Intelligence (AI) search and retrieval system;

executing, by the one or more processors, one or more multidimensional sorting rules to the first set of relevancy-ranked content items, and generating a second set of relevancy-ranked content items having a different sorted order than the first set of relevancy-ranked content items, wherein one of the multidimensional sorting rules includes a promoted slot selector that modifies a sort order of a promoted content item, wherein one or more of the content items of the first relevancy ranked content items have a display slot position that has been changed to a different display slot position for the same content items of the second set of relevancy-ranked content items;

generating, by the one or more processors, a carousel display structure definition of the second set of relevancy-ranked content items, wherein the carousel display structure definition identifies multiple display groupings and an order of each display grouping for the relevancy-ranked content items, and wherein the second set of relevancy-ranked content items have an associated display grouping value and a display slot position; and rendering, via a user interface of the client device, at least a portion of the second set of relevancy-ranked content items in the respective multiple display groupings and the display slot positions according to the display structure definition.

16. The non-transitory computer readable medium of claim 15, wherein generating the carousel display structure definition of the second set of relevancy-ranked content items comprises:

assigning the second set relevancy-ranked content items into a predetermined number of display groupings, wherein the predetermined number of display groupings includes 2 or more groupings, and wherein each display grouping includes a predetermined number of display slots, wherein a display slot is an ordered position in a display grouping.

17. The non-transitory computer readable medium of claim 16, further comprising:

determining a group order position for each of the display groupings by:

determining a grouping score of the second set of relevancy-ranked content items assigned to a set of a predetermined number of display slot positions for a respective display grouping; and sorting the display grouping according to the determined grouping score.

18. The non-transitory computer readable medium of claim 15, wherein generating the first set of relevancy-ranked output comprises:

causing the generated search criterion to be processed, via the generative AI search and retrieval system, comprising one more machine learning models; and generating by the generative AI search and retrieval system, a relevancy-ranked output listing of content items responsive to the generated search criterion, wherein the content items of the output listing each have a content identifier and a content description.

19. The non-transitory computer readable medium of claim 15, wherein causing the generated search criterion to be processed, via a search system, comprises the operations of:
   performing, by the one or more processors, a first stage scoring process, to generate an initial set of content items; and
   performing, by the one or more processors, a second stage scoring process, by processing the initial set of content items by an inferencing machine learning model trained to determine content item score values; and
   generating, by the inferencing machine learning model, item score values for the initial set of content items.

20. The non-transitory computer readable medium of claim 19, further comprising the operations of:
   performing, by the one or more processors, a third stage scoring process that modifies an item score value to adjust a content item position placement in the first set of relevancy-ranked output listing.

21. The non-transitory computer readable medium 19, further comprising the operations of:
   performing, by the one or more processors, a blender process that generates annotations for one or more of the content items in the relevancy-ranked output listing, wherein the generated annotations comprise a type of content item for a respective content item in the relevancy-ranked output listing.

* * * * *